(12) United States Patent
Fujishima et al.

(10) Patent No.: US 10,091,225 B2
(45) Date of Patent: Oct. 2, 2018

(54) NETWORK MONITORING METHOD AND NETWORK MONITORING DEVICE

(71) Applicant: FUJITSU LIMITED, Kawasaki-shi, Kanagawa (JP)

(72) Inventors: Yuki Fujishima, Yokohama (JP); Masanobu Morinaga, Yokohama (JP); Mebae Yamaoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 181 days.

(21) Appl. No.: 15/138,718

(22) Filed: Apr. 26, 2016

(65) Prior Publication Data

US 2016/0337385 A1    Nov. 17, 2016

(30) Foreign Application Priority Data

May 13, 2015  (JP) .................................. 2015-098622

(51) Int. Cl.
*H04L 29/00* (2006.01)
*H04L 29/06* (2006.01)

(52) U.S. Cl.
CPC ........ *H04L 63/1425* (2013.01); *H04L 63/145* (2013.01)

(58) Field of Classification Search
CPC ....................... H04L 63/1416; H04L 63/1425; H04L 63/145
See application file for complete search history.

(56) References Cited

U.S. PATENT DOCUMENTS

| | | | | |
|---|---|---|---|---|
| 6,973,581 | B2 * | 12/2005 | Chung | G06K 7/10346 705/12 |
| 9,769,190 | B2 * | 9/2017 | Coskun | H04L 63/1425 |
| 2008/0201464 | A1 * | 8/2008 | Campbell | H04L 29/06 709/224 |
| 2010/0132041 | A1 * | 5/2010 | Chu | H04L 63/1416 726/24 |
| 2012/0030750 | A1 * | 2/2012 | Bhargava | H04L 63/02 726/13 |
| 2014/0115663 | A1 | 4/2014 | Fujishima et al. | |

(Continued)

FOREIGN PATENT DOCUMENTS

| | | |
|---|---|---|
| JP | 2005-250802 | 9/2005 |
| JP | 2014-086822 | 5/2014 |

*Primary Examiner* — Don G Zhao
(74) *Attorney, Agent, or Firm* — Fujitsu Patent Center

(57) ABSTRACT

A device includes a processor configured to accumulate a plurality of logs in the memory, by repeating a capturing process and a logging process, the logging process including extracting a source identifier of a source computer, a destination identifier of a destination computer, and an attribute parameter which is set in an attribute item regarding an operation for the destination computer by the source computer, execute a detection process of detecting a target computer and another infected computer, the detection process including extracting a first destination identifier and a first attribute parameter, from a first log having an identifier of the infected computer in the source identifier, and extracting a second source identifier and a second destination identifier, from a second log having the first attribute parameter in the attribute parameter, and output the first destination identifier, the second source identifier, and the second destination identifier.

20 Claims, 34 Drawing Sheets

(56) References Cited

U.S. PATENT DOCUMENTS

2015/0341389 A1\* 11/2015 Kurakami ............... H04L 63/20
                                                                    726/1
2017/0013018 A1\* 1/2017 Nakata ................ H04L 12/6418
2017/0070528 A1\* 3/2017 Coskun ............... H04L 63/1425

\* cited by examiner

| OPERATION LOG | | | | | | |
|---|---|---|---|---|---|---|
| DATE AND TIME | SOURCE IP ADDRESS | SOURCE PORT NUMBER | DESTINATION IP ADDRESS | DESTINATION PORT NUMBER | COMMAND AND OPTION | ATTRIBUTE DATA |
| ... | ... | ... | ... | ... | ... | ... |
| $T_2$ | x.x.x.2 | $P_3$ | x.x.x.7 | $P_4$ | FILE READ | FILE PATH=c\biz.csv, ACCOUNT NAME=adminX |

OPERATION LOG

| DATE AND TIME | SOURCE IP ADDRESS | SOURCE PORT NUMBER | DESTINATION IP ADDRESS | DESTINATION PORT NUMBER | COMMAND AND OPTION | ATTRIBUTE DATA |
|---|---|---|---|---|---|---|
| ... | ... | ... | ... | ... | ... | ... |
| $T_3$ | x.x.x.1 | $P_5$ | x.x.x.3 | $P_6$ | TASK REGISTRATION | TASK PATH=c:¥mware.exe, ACCOUNT NAME=admimX |

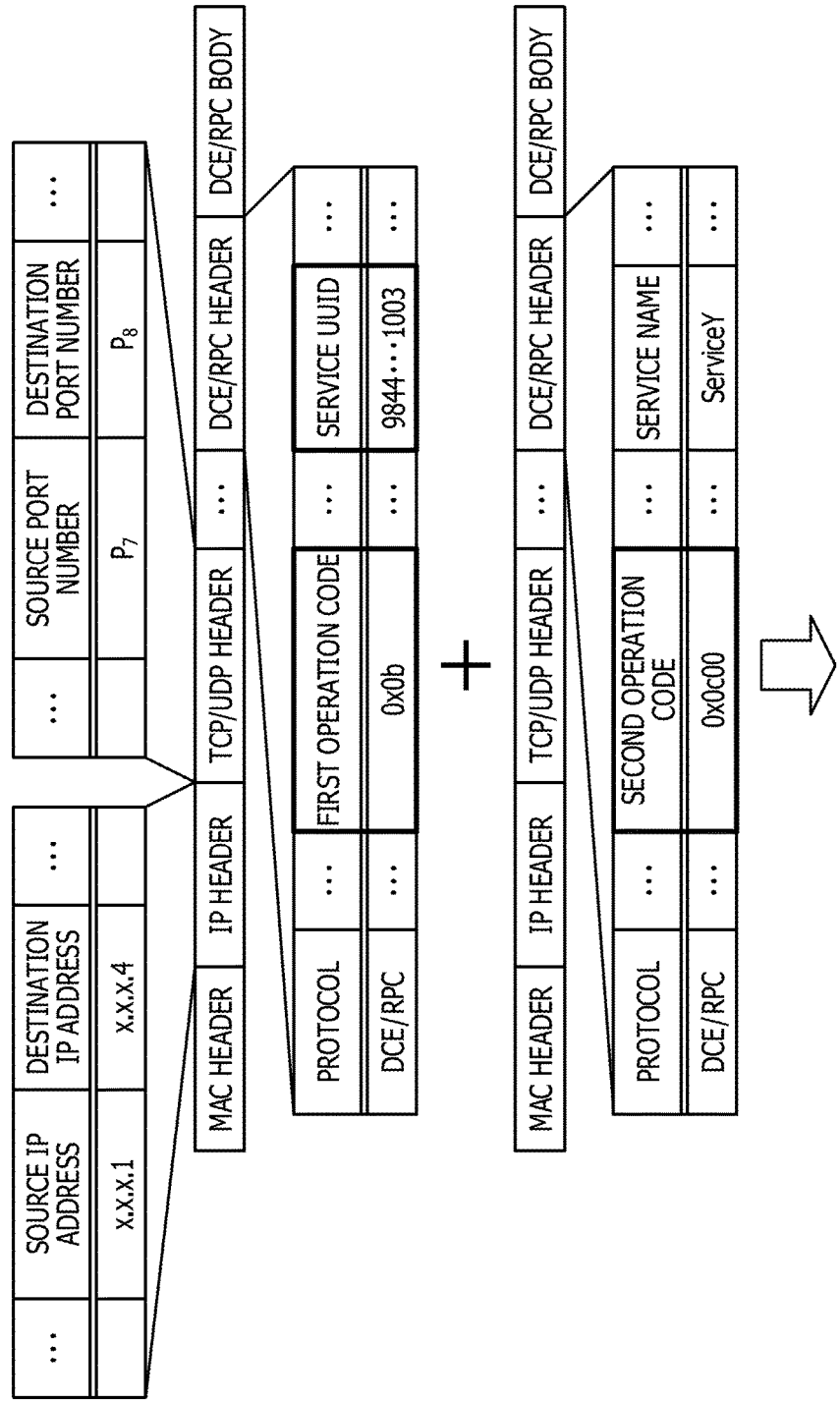

| OPERATION LOG | | | | | | |
|---|---|---|---|---|---|---|
| DATE AND TIME | SOURCE IP ADDRESS | SOURCE PORT NUMBER | DESTINATION IP ADDRESS | DESTINATION PORT NUMBER | COMMAND AND OPTION | ATTRIBUTE DATA |
| ... | ... | ... | ... | ... | ... | ... |
| $T_4$ | x.x.x.1 | $P_7$ | x.x.x.4 | $P_8$ | SERVICE REGISTRATION | SERVICE NAME=ServiceY, ACCOUNT NAME=userA |

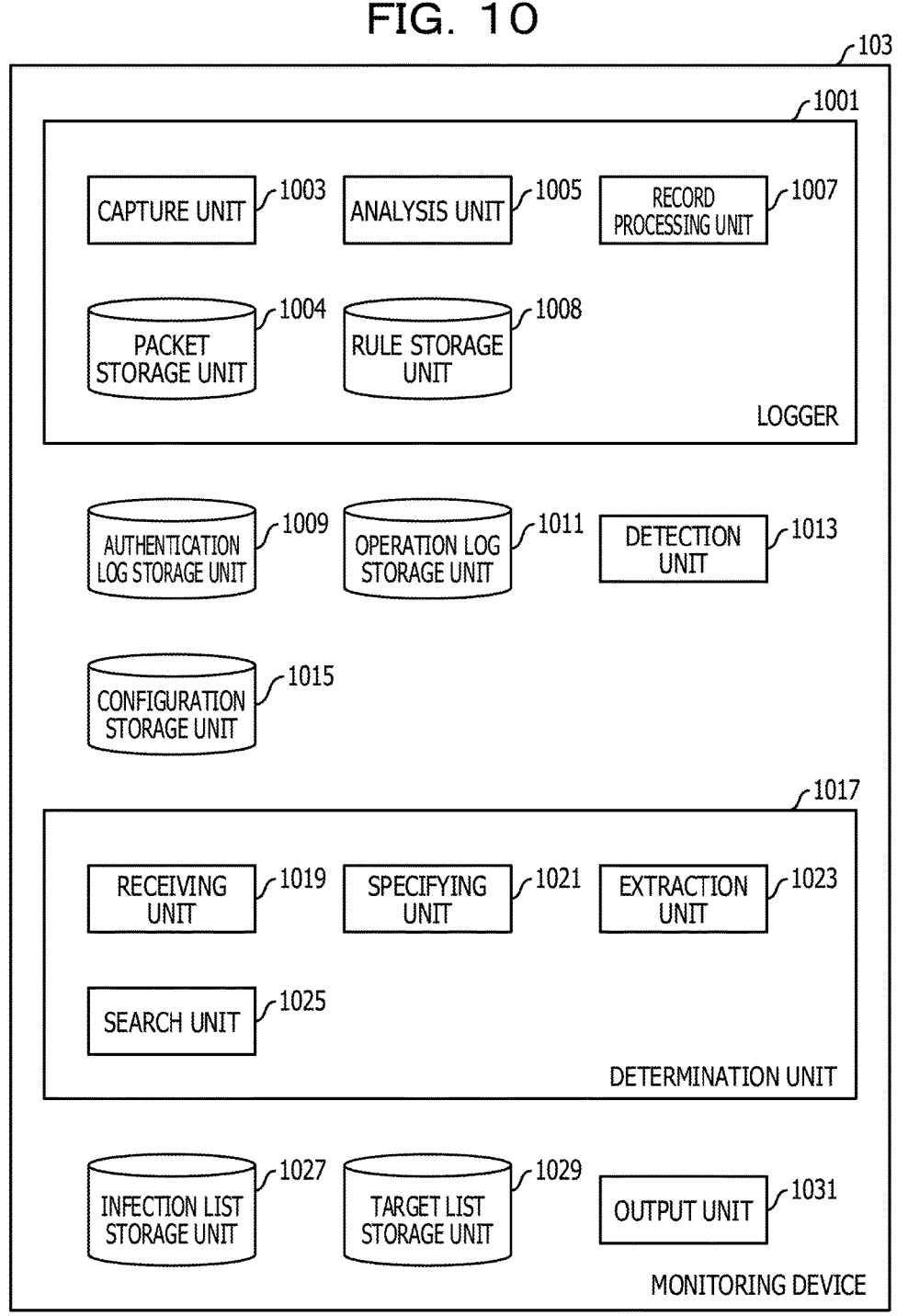

FIG. 16

| DATE AND TIME | SOURCE IP ADDRESS | SOURCE PORT NUMBER | DESTINATION IP ADDRESS | DESTINATION PORT NUMBER | AUTHENTICATION TYPE | ATTRIBUTE DATA |
|---|---|---|---|---|---|---|
| $T_1$ | x.x.x.1 | $P_1$ | x.x.x.2 | $P_2$ | SMB AUTHENTICATION | DOMAIN NAME=DomA, ACCOUNT NAME=adminX |

FIG. 18

| DATE AND TIME | SOURCE IP ADDRESS | SOURCE PORT NUMBER | DESTINATION IP ADDRESS | DESTINATION PORT NUMBER | AUTHENTICATION TYPE | ATTRIBUTE DATA |
|---|---|---|---|---|---|---|
| $T_1$ | x.x.x.1 | $P_1$ | x.x.x.2 | $P_2$ | SMB AUTHENTICATION | DOMAIN NAME=DomA, ACCOUNT NAME=adminX |
| $T_5$ | x.x.x.2 | $P_1$ | x.x.x.5 | $P_2$ | SMB AUTHENTICATION | DOMAIN NAME=DomA, ACCOUNT NAME=adminX |
| $T_6$ | x.x.x.3 | $P_9$ | x.x.x.6 | $P_{10}$ | DCE/RPC AUTHENTICATION | DOMAIN NAME=DomB, ACCOUNT NAME=adminX |

FIG. 20

IP ADDRESS=x.x.x.5

| DATE AND TIME | EVENT TYPE | ACCOUNT NAME | DOMAIN NAME | ATTRIBUTE DATA |
|---|---|---|---|---|
| $T_5$ | LOG-ON | adminX | DomA | REQUEST SOURCE IP ADDRESS=x.x.x.2 |
| $T_{13}$ | LOG-OFF | adminX | DomA | (WITHOUT ATTRIBUTE DATA) |

FIG. 23

| DATE AND TIME | SOURCE IP ADDRESS | SOURCE PORT NUMBER | DESTINATION IP ADDRESS | DESTINATION PORT NUMBER |
|---|---|---|---|---|
| $T_3$ | x.x.x.1 | $P_5$ | x.x.x.3 | $P_6$ |
| $T_7$ | x.x.x.2 | $P_{11}$ | x.x.x.8 | $P_{12}$ |
| $T_8$ | x.x.x.5 | $P_{11}$ | x.x.x.9 | $P_{12}$ |
| $T_{11}$ | x.x.x.5 | $P_{13}$ | x.x.x.9 | $P_{14}$ |

| COMMAND AND OPTION | ATTRIBUTE DATA |
|---|---|
| TASK REGISTRATION (WITHOUT OPTION) | TASK PATH=c:¥mware.exe, ACCOUNT NAME=admimX |
| FILE WRITE (WITHOUT OPTION) | FILE PATH=c:¥mware.exe, ACCOUNT NAME=userB |
| FILE WRITE (WITHOUT OPTION) | FILE PATH=c:¥mware.exe, ACCOUNT NAME=admimX |
| SCHEDULING OF TASK (WITHOUT OPTION) | SCHEDULE PATH=c:¥mware.exe, ACCOUNT NAME=userC |

FIG. 24

IP ADDRESS=x.x.x.9

| DATE AND TIME | EVENT TYPE | ACCOUNT NAME | DOMAIN NAME | ATTRIBUTE DATA |
|---|---|---|---|---|
| $T_{12}$ | PROCESS START-UP | userC | DomC | PROCESS NAME=c:¥mware.exe |

NETWORK MONITORING METHOD AND NETWORK MONITORING DEVICE

CROSS-REFERENCE TO RELATED APPLICATION

This application is based upon and claims the benefit of priority of the prior Japanese Patent Application No. 2015-098622, filed on May 13, 2015, the entire contents of which are incorporated herein by reference.

FIELD

The embodiments discussed herein are related to a security technique for cyberattacks.

BACKGROUND

An information processing system using an intranet is highly convenient for the user. Meanwhile, in a case where a remote administration tool (RAT) invades such an information processing system, for example, for the purpose of a targeted attack, this results in a risk of, for example, confidential data leakage.

In contrast, there is a technique for monitoring a predetermined action by the RAT. It is possible to recognize a part of an infringement range, by detecting a computer infected by the RAT and recognizing the trace of the attack against the infected computer, using this technique.

In addition, the related art is disclosed in for example, Japanese Laid-open Patent Publication No. 2014-86822, and Japanese Laid-open Patent Publication No. 2005-250802.

SUMMARY

According to an aspect of the invention, a network monitoring device includes a memory and a processor coupled to the memory and configured to accumulate a plurality of logs in the memory, by repeating a capturing process of capturing a packet transmitted over the network, and a logging process of generating a log of the packet, the logging process including: extracting, from the packet, a source identifier of a source computer, a destination identifier of a destination computer, and an attribute parameter which is set in an attribute item regarding an operation for the destination computer by the source computer, and storing, into the memory, the log including the source identifier, the destination identifier, and the attribute parameter, execute a detection process of detecting a target computer having a possibility of being attacked by an infected computer and another infected computer, with reference to the plurality of logs, when the infected computer which is infected with a virus is specified, the detection process including: extracting a first destination identifier and a first attribute parameter, from a first log having an identifier of the infected computer in the source identifier, and extracting a second source identifier and a second destination identifier, from a second log having the first attribute parameter in the attribute parameter, and output the first destination identifier, the second source identifier, and the second destination identifier, as the target computer and the other infected computer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9A is a diagram illustrating an example of a request message for service registration;

FIG. 10 is a diagram illustrating a configuration example of modules of a monitoring device;

FIG. 16 is a diagram illustrating an example of a record for authentication that an infected computer has requested;

FIG. 18 is a diagram illustrating an example of a record for authentication using the same account name as at the time of unauthorized authentication;

FIG. 20 is a diagram illustrating an example of a record for an event using the same account name as at the time of unauthorized authentication;

FIG. 23 is a diagram illustrating an example of a record for a remote operation using the same file name as at the time of an unauthorized remote operation;

FIG. 24 is a diagram illustrating an example of a record for an event using the same file name as at the time of an unauthorized remote operation;

DESCRIPTION OF EMBODIMENTS

If an RAT is a self-reproducing type, there may be another hidden infected computer. In a case where the infected computer is in hiding in the information processing system, the attack is likely to continue thereafter. Further, the actual infringement range may be wider than the range that the administrator assumes.

In addition, in a case of being damaged due to cyberattacks, the victims themselves may be held responsible for third parties. Therefore, it is also socially important to specify the infringement range due to the cyberattacks.

The technique disclosed in embodiments facilitates the specification of the infringement range due to the cyberattacks, in an aspect.

Embodiment 1

Figure 1:
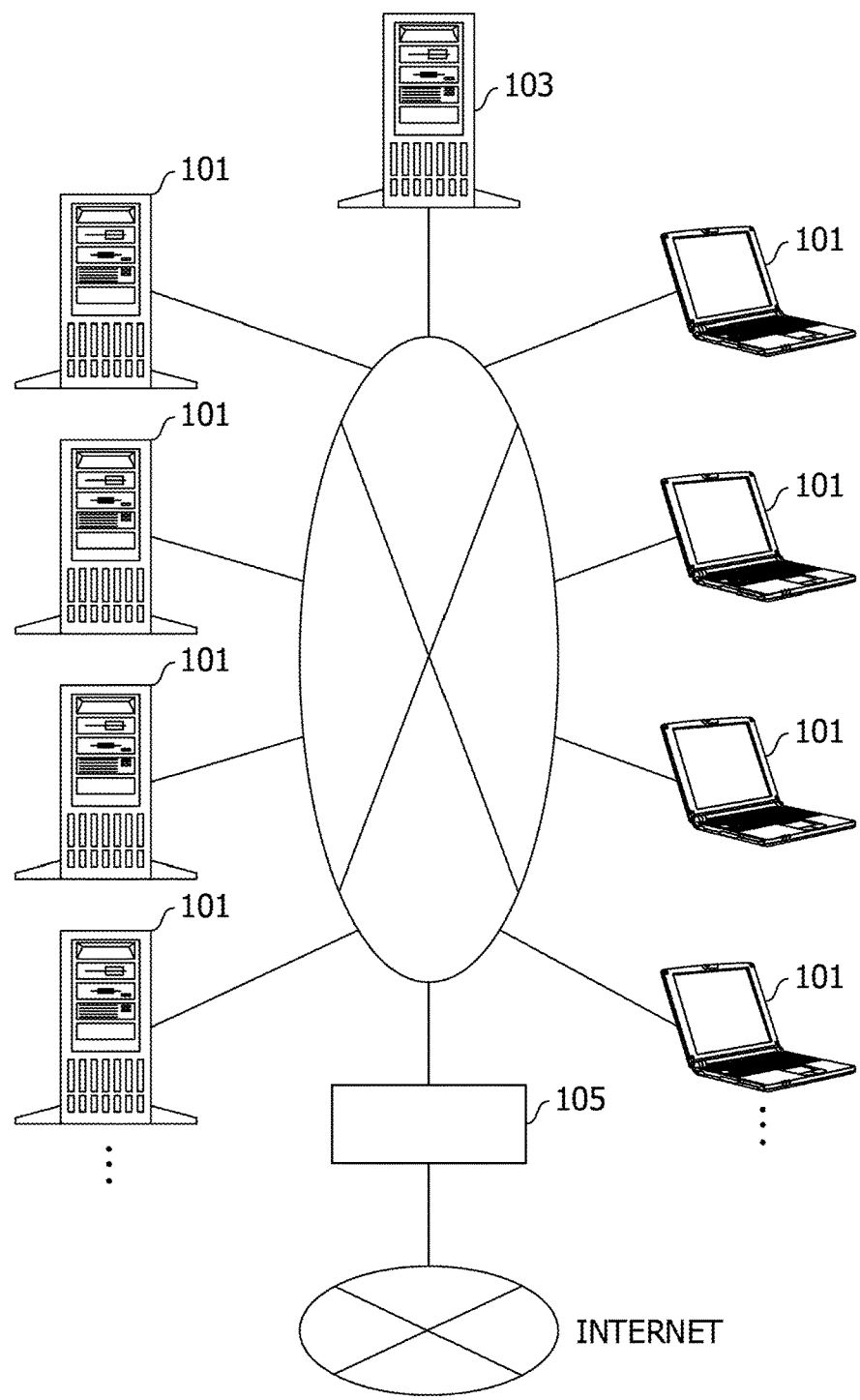
FIG. 1 is a diagram illustrating an example of an information processing system.

FIG. 1 illustrates an information processing system. A plurality of computers 101 are connected through a network (for example, a local area network (LAN)). The network is connected to the Internet through a firewall 105. For example, an information processing system of an intranet is assumed. The computer 101 is, for example, a server device or a client terminal. The function of the server device is optional. The server device may be, for example, a domain management server, a Web server, a file server, a Windows (registered trademark) server, a Samba server, or the like.

Each client terminal may use services that respective server devices provide. Each client terminal may use data that is stored in each server device. Further, a plurality of server devices may cooperate with each other in some cases. Client terminals may share data with each other. A client terminal may use the service that another client terminal provides.

In other words, it is assumed that some computers 101 perform remote operations optionally on each other, under predetermined conditions. Therefore, controls based on SMB and/or DCE/RPC are performed between a plurality of computers 101. The SMB and DCE/RPC are examples of protocol in an application layer providing a function of a remote operation.

Malware is, for example, an RAT that performs a targeted attack. The malware is sent to the computer 101 in the information processing system, through a targeted email or an unauthorized site. The malware that was sent performs, for example, the following unauthorized operation, in response to an instruction from an attacker outside the information processing system. In this way, the computer 101 invaded by the malware is referred to as an infected computer.

The malware performs an OS scan and a service scan for the computer 101 in the periphery of the infected computer, collects information on the internal situation of the information processing system, and transmits the information to the attacker. The attacker selects a target of attack from the periphery computers 101. In this way, the computer 101, which became the target of attack, is referred to as a target computer.

The malware creates an environment for stealing internal information, by illegally manipulating the target computer, in response to an instruction from the attacker. In this case, for example, an attack computer performs remote operations such as account registration, file writing, task registration, service registration and service start-up, on the target computer.

In addition, the malware reads the internal information from the target computer, in response to an instruction from the attacker. Internal information is transmitted directly or indirectly, for example, to the attacker present outside, from the attack computer.

The malware may send its own replication to another computer 101. In other words, the malware may perform self-reproduction in the information processing system in some cases. If such an unauthorized remote operation is repeated, the infringement range expands sequentially. Risk such as data leakage and data falsification is increased.

Further, the malware deletes the traces of its attack at the stage to finish the attack, in response to an instruction from the attacker. Therefore, the malware performs a remote operation such as account delete, file delete, task delete, service stop, service delete and log delete, on the target computer. Further, the malware perform the same operations on the infected computer.

In the present embodiment, data about attacks is extracted from various types of transmission data, and the infringement range is specified. The related art is used, at a stage of first finding malware. For example, there is a technique for detecting an operation of the malware reading the internal information from the target computer, and an operation of the malware performing communication with a device present in the outside of the information processing system.

If detecting an infected computer, the monitoring device 103 specifies the unauthorized remote operation that the infected computer has performed. Then, the monitoring device 103 specifies an undetected infected computer and an undetected target computer by extracting the remote operation that is similar to the unauthorized remote operation that the infected computer has performed.

In addition, the function of the monitoring device 103 may be allowed to be shared with a plurality of servers. For example, a first monitoring server detects the infected computer 101. A second monitoring server may detect another infected computer 101 and another computer 101 that is attacked.

The monitoring device 103 is connected to a network, for example, through a switch or a network tap, which enables port mirroring.

Figure 2:
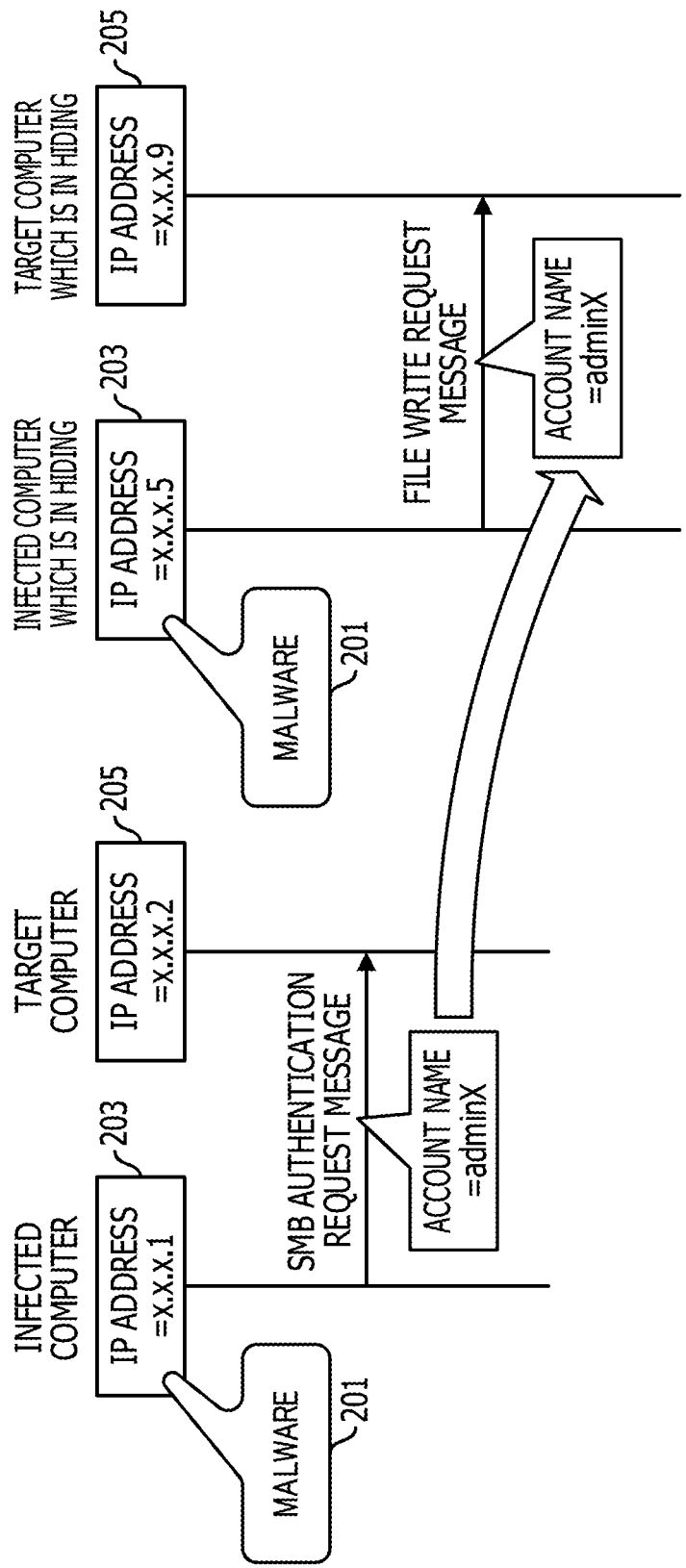
FIG. 2 is a diagram illustrating similarity between attribute data pieces in a remote operation.

Next, the similarity between attribute data pieces in the remote operations will be described with reference to FIG. 2. The left side of FIG. 2 illustrates a state where an infected computer 203 of an internet protocol (IP) address "x.x.x.1", which is infected with malware 201, sends an SMB authentication request message to a target computer 205 of an IP address "x.x.x.2", as a part of the attack by the malware 201. It is assumed that the SMB authentication request message contains an account name "adminX". In this case, the infected computer 203 corresponds to a request side. In addition, the target computer 205 corresponds to a response side. In the following description, a packet sent from the request side may be referred to as a request message. Similarly, a packet sent from the response side may be referred to as a response message.

In this example, the target computer 205 receives the request message and performs SMB authentication. If the account name "adminX" contained in the request message is the account name that was registered in advance in the service unit of the target computer 205, the authentication is successful. Therefore, the attacker steals the account name of other person using any method, or illegally registers the account name. In the case where the infected computer 203 is detected by a detection technique in the related art, it is relatively easy to specify the target computer 205 that is attacked by the infected computer 203 that is detected.

Meanwhile, in a case where the malware 201 has a function to replicate itself to other computer 101, other infected computers 203 infected with the malware 201 may be present in the information processing system. Here, a case where the malware 201 performs self-reproduction is assumed.

The infected computer 203 of an IP address "x.x.x.5" illustrated on the right side of FIG. 2 is not yet detected. In other words, the infected computer 203 is in hiding. The right side illustrates a state where the infected computer 203 sends an SMB authentication request message to a target computer 205 of an IP address "x.x.x.9", as a part of attack by the malware 201. At this time, it is not found that the target computer 205 is attacked. In other words, the target computer 205 is also in hiding.

In this example, the SMB authentication request message on the right side also contains the same account name "adminX". In this way, the attacker uses the account name that was once acquired in the attack from other infected computer 203.

In a case where the stolen account name is reused, or the same account name is repeatedly used due to the characteristic of the malware 201, if checking a packet captured, using the account name that was used in the known attack as a search key, it is possible to specify the attack by the infected computer 203 that is in hiding.

Information which is a search key is not limited to the account name. In this embodiment, unauthorized access is distinguished by also monitoring attribute data other than the account name.

In the case of attribute items which have high arbitrariness of parameters, it may be estimated that repeatedly appearing parameters are reused by the same request source in some aspects. Further, in the case of attribute items which have low arbitrariness of parameters, infrequent attribute parameters may be highly likely to be limitedly used by a particular request source in some aspects. In other words, if the parameters are the same, it may be estimated that the request sources are common in some cases. In the following, the parameters of attribute data may be referred to as attribute parameters.

In this embodiment, because the previous infected computer 203 is not specified by tracing the route of infection from the original infected computer 203, even if the route of infection is hidden, a new infected computer 203 may be easily found in some aspects.

Figure 3:
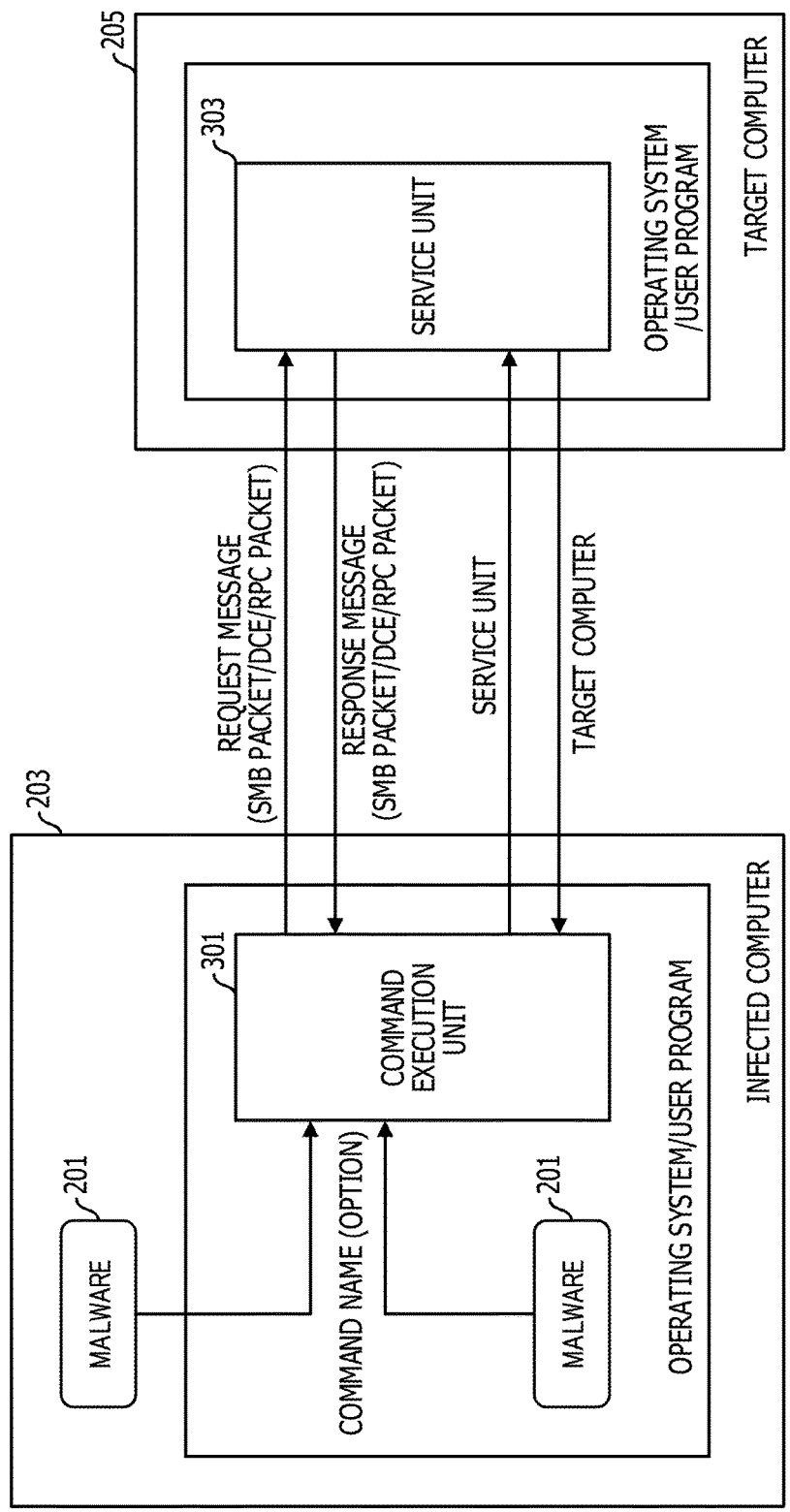
FIG. 3 is a diagram illustrating an outline of a remote operation by malware.

An outline of the remote operation by the malware 201 will be described with reference to FIG. 3. For example, the malware 201 may be present as an independent program, under cover of a user program. In a case where unknown processes are increased as compared with the normal time, there is a possibility that the malware 201 has started as a process.

Further, the malware 201 may be injected into the operating system in some cases. In such a case, although a program of a library routine such as, for example, a dynamic link library (DLL) is added, an unknown process is not increased. Similarly, the malware 201 may be injected into a legitimate user program, in some cases. Therefore, there is a concern of missing the malware 201, only by monitoring the process.

The malware 201 attempts an unauthorized remote operation using the command execution unit 301. In other words, the malware 201 issues a command to the command execution unit 301 under cover of a legitimate route, and indirectly operates the service unit 303 of the target computer 205. Alternatively, the malware 201 itself may have a function corresponding to the command execution unit 301 in some cases. In this case, the malware 201 directly exchanges the same message as in the case of the command execution unit 301, with the service unit 303 of the target computer 205, and performs a process corresponding to a predetermined command.

Here, a description will be made regarding the operations of the command execution unit 301 and the service unit 303 which are a prerequisite technique. The operations of the command execution unit 301 and the service unit 303 are the same in the case where the computer 101 is infected with the malware 201 and in the case where the computer 101 is not infected with the malware 201.

The command execution unit 301 sends a request message for a remote operation, to the service unit 303. The service unit 303 receives the request message and provides a service.

In many cases, the computer 101 is provided with a variety of command execution units 301 and service units 303. The service unit 303 provides, for example, a service to control various services. In addition, there is a service unit 303 that provides a file access service, a service unit 303 that provides a network sharing service, a service unit 303 that provides a register operation service, or the like.

The service unit 303 may be provided in the user program in some cases, in addition to the case where it is provided in the operating system. The command execution unit 301 may be provided in the user program in some cases, in addition to the case where it is provided in the operating system.

Normally, the command execution unit 301 is called, for example, from a module inside or outside of the operating system or the user program, or is called through a graphical user interface (GUI) so as to execute a command. Specifically, the command execution unit 301 receives a command name, or a combination of a command name and options.

In this embodiment, it is assumed that the command execution unit 301 exchanges a request message and a response message with the service unit 303, based on the SMB and/or the DCE/RPC. The messages are exchanged in order to execute a command, sometimes once, and sometimes several times.

In a case where the malware 201 invades the inside of the operating system or the user programs, the malware 201 internally calls the command execution unit 301. In a case where the malware 201 is present in the outside of the operating system or the user programs, the malware 201 calls the command execution unit 301 from the outside. Further, even in a case where the malware 201 itself performs an operation corresponding to the command execution unit 301, the infected computer 203 performs a process corresponding to the command execution, according to the protocol of SMB and/or DCE/RPC.

Figure 4:
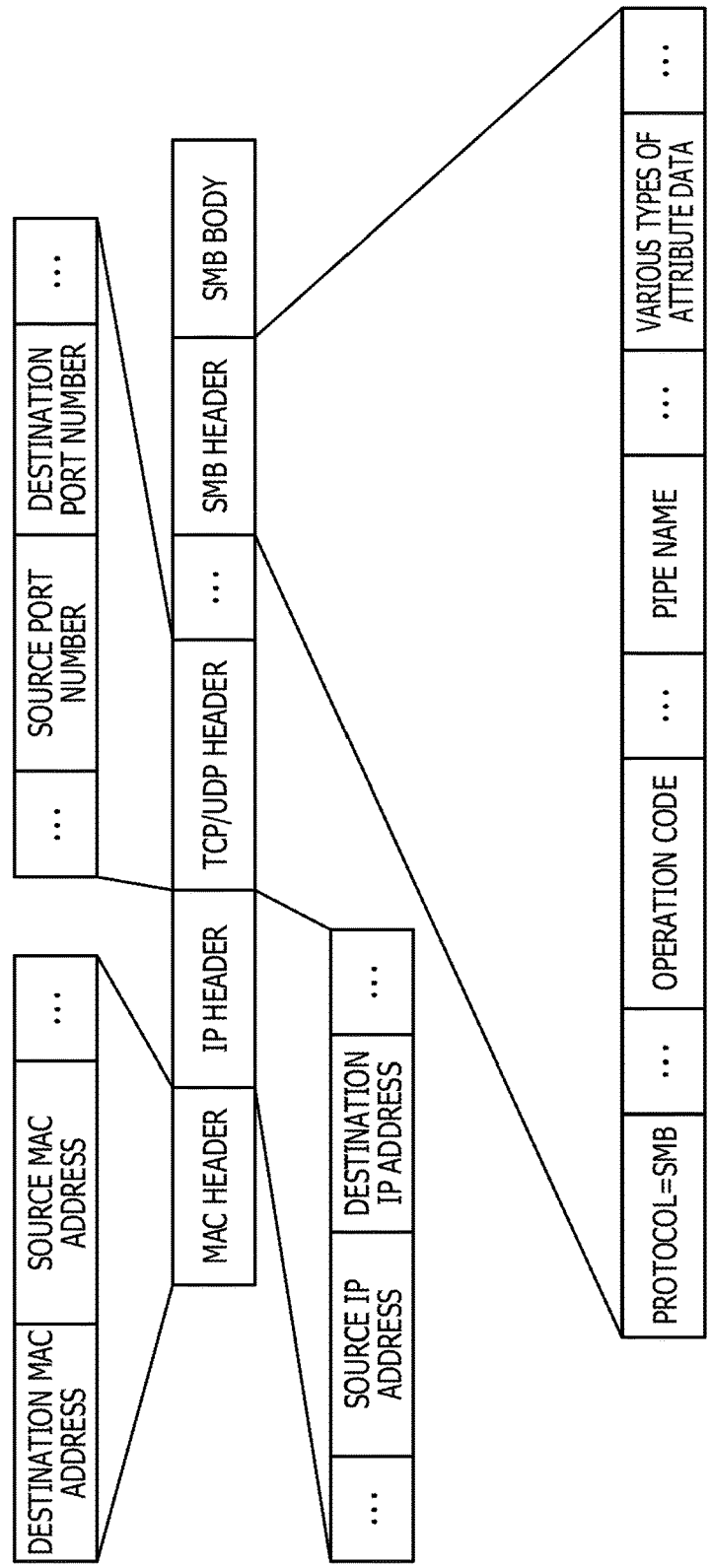
FIG. 4 is a diagram illustrating a configuration of a server message block (SMB) packet.

Subsequently, a description will be made regarding a configuration of a packet. FIG. 4 illustrates a structure of a packet used in the control by the SMB protocol. Hereinafter, the packet used in the control by the SMB protocol is referred to as an SMB packet. As illustrated in FIG. 4, a media access control (MAC) header contains a field for setting a destination MAC address, and a field for setting a source MAC address. The source MAC address is the MAC address of the computer 101 that sends the packet. The destination MAC address is the MAC address of the computer 101 that receives the packet.

In addition, the IP header contains a field for setting a source IP address, and a field for setting a destination IP address. The source IP address is the IP address of the computer 101 that sends the packet. The destination IP address is the IP address of the computer 101 that receives the packet.

In a case where the SMB packet is sent according to a transmission control protocol (TCP), the packet has a TCP header. In a case where the SMB packet is sent according to a user datagram protocol (UDP), the packet has a UDP header. In this example, the TCP/UDP header is denoted as meaning that there is a TCP header or a UDP header. Even in a case of the TCP header or the UDP header, the header contains a field for setting a source port number, and a field for setting a destination port number. The source port number is the number of the port from which the packet is sent. The destination port number is the number of the port to which the packet is received.

In this example, a header about NetBios will be omitted.

The SMB packet has an SMB header and an SMB body. The SMB header contains a field for setting a protocol, a field for setting an operation code, and a field for setting a pipe name. An SMB identifier is set in the protocol. Incidentally, the SMB identifier includes an SMB version. An operation code is an identifier of an operation in the SMB. The pipe name is the name of a pipe which is one of the data transmission formats. The pipe name is defined uniquely for the service. Thus, the service to be used is specified by the pipe name.

The SMB header contains various types of attribute data. However, the attribute item and the storage position may vary depending on the type of an SMB packet. The type of an SMB packet is determined by one or both of the operation code and the pipe name. Examples of attribute data will be described later. Incidentally, the SMB body may contain attribute data in some cases. The SMB also supports a file access service.

Figure 5:
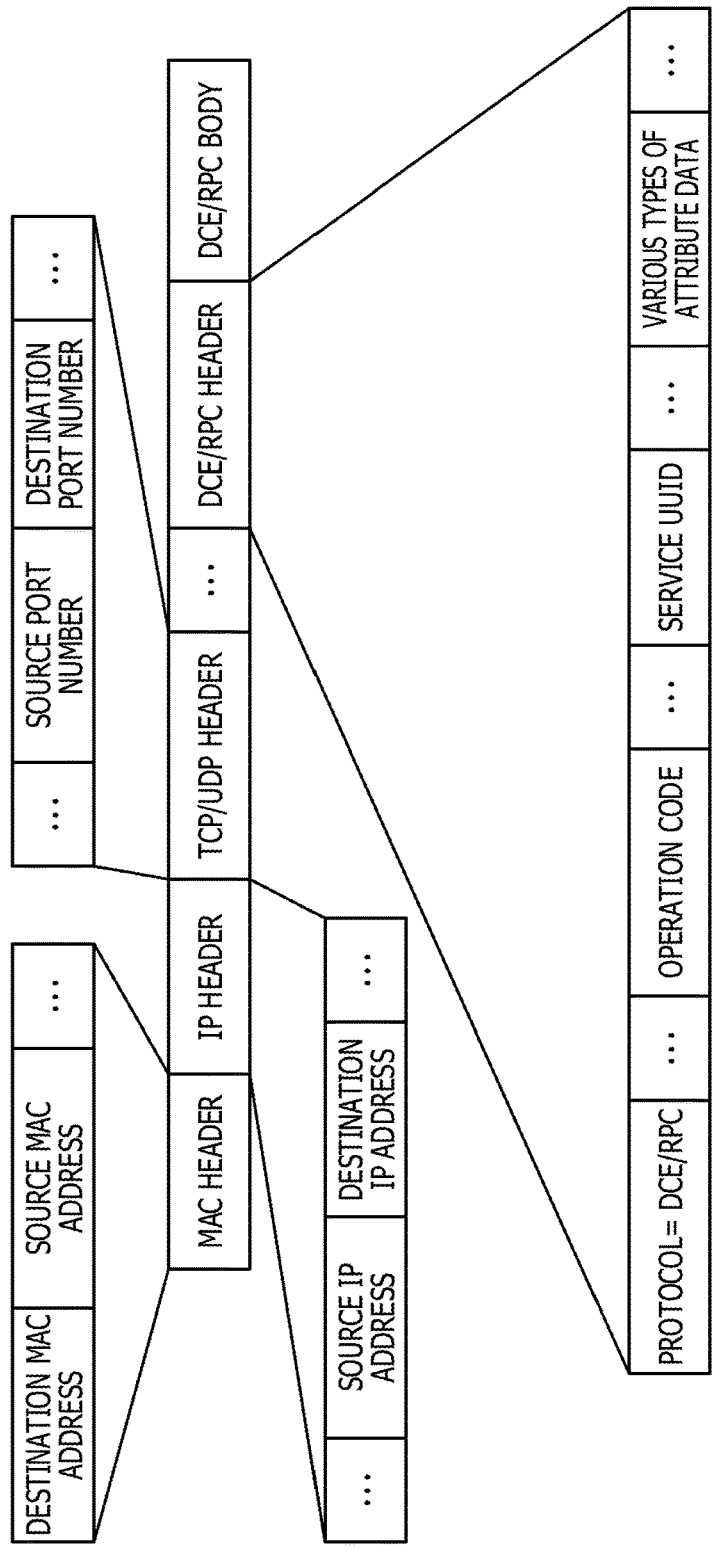
FIG. 5 is a diagram illustrating a configuration of a distributed computing environment/remote procedure calls (DCE/RPC) packet.

FIG. 5 illustrates the configuration of the DCE/RPC packet. Hereinafter, a packet used in the control by the DCE/RPC protocol is referred to as a DCE/RPC packet.

The MAC header, the IP header and the TCP/UDP header are the same as in the case of the SMB packet illustrated in FIG. 4.

The DCE/RPC packet has a DCE/RPC header and a DCE/RPC body.

The DCE/RPC header contains a field for setting a protocol, a field for setting an operation code, and a field for setting a service universally unique identifier (UUID). A DCE/RPC identifier is set in the protocol. The operation code is an identifier of an operation in DCE/RPC. The service UUID is defined uniquely for the service. Thus, the service to be used is specified by the service UUID. Incidentally, DCE/RPC does not support the file access service.

The monitoring device 103 captures the SMB packet and DCE/RPC packet, and performs logging. Hereinafter, a relation between the log and the request message which is the SMB packet or the DCE/RPC packet will be described. FIG. 6 to FIG. 9B illustrates an example of the relationship between the various request messages and logs.

Figure 6:
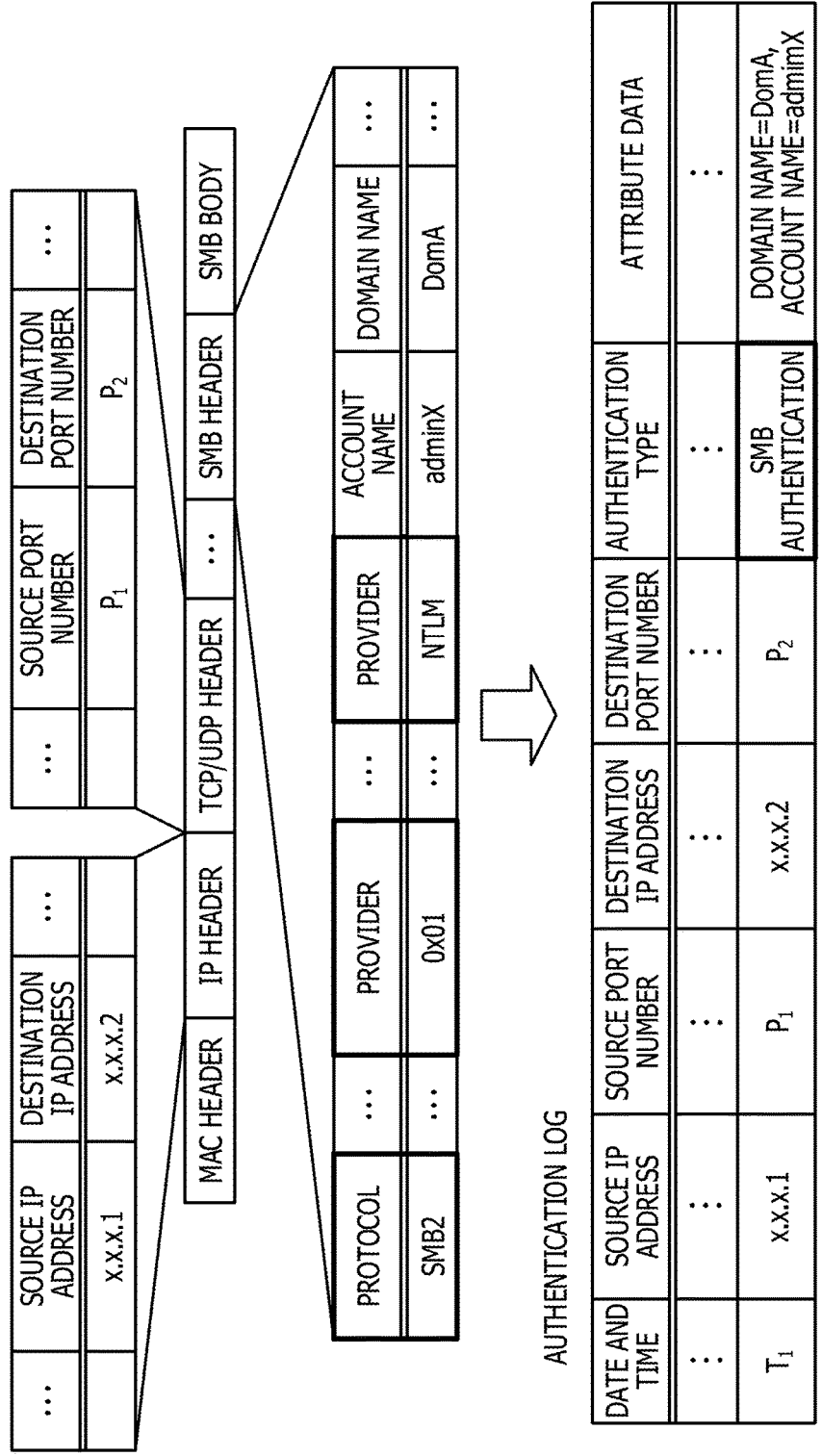
FIG. 6 is a diagram illustrating an example of a request message and an authentication log for SMB authentication.

FIG. 6 illustrates an example of a request message and an authentication log for authentication in the SMB protocol (in other words, SMB authentication). In a case of attempting to illegally use the service unit 303, the malware 201 may directly or indirectly send an SMB authentication request message to the service unit 303.

In this example, since the computer 101 is determined by the IP address, the MAC address will not be described. However, the computer 101 may be determined by the MAC address.

It is assumed that the SMB authentication request message illustrated in FIG. 6 is sent from the computer 101 of the IP address "x.x.x.1" to the computer 101 of the IP address "x.x.x.2". Therefore, "x.x.x.1" is set in the source IP address field, and "x.x.x.2" is set in the destination IP address field.

It is assumed that the request message is sent to the port of port number "$P_2$" of the destination computer 101 from the port of port number "$P_1$" of the source computer 101. Therefore, "$P_1$" is set in the source port number field and "$P_2$" is set in the destination port number field.

It is assumed that a procedure for SMB authentication in this example conforms to an SMB version 2. Therefore, "SMB2" is set in the protocol field. The operation code "0x01" corresponds to an authentication request. The "NT LAN Manager (NTLM)" of a provider indicates that the authentication method is NTLM.

In a case of coinciding with the condition in which the protocol set in the captured packet is "SMB2", the operation code is "0x01", and the provider is "NTLM", it is determined that the packet corresponds to the SMB authentication request message.

Thus, in a case where the monitoring device 103 detects a packet corresponding to the SMB authentication request message, the contents of the request message are recorded in the authentication log. A new record indicating the contents of the SMB authentication request message in the upper part is provided in the authentication log indicated by the arrow in FIG. 6.

The authentication log in this example is a table format. A record corresponding to a request message for requesting SMB authentication or authentication in the DCE/RPC protocol (hereinafter referred to as DCE/RPC authentication) is provided in the authentication log. The record of the authentication log has a field for setting date and time, a field for setting a source IP address, a field for setting a source port number, a field for setting a destination IP address, a field for setting a destination port number, a field for setting an authentication type, and a field for setting attribute data. The date and time is a date and time when the packet is captured. The source IP address and the destination IP address are extracted from the IP header of the packet. The source port number and the destination port number are extracted from the TCP/UDP header of the packet. The authentication type in this example is one of SMB authentication and DCE/RPC authentication.

In this example, the attribute item and the attribute parameter are set in a pair in the attribute data field. The attribute data for authentication contains, for example, a domain name and an account name. The domain name and the account name are extracted from the SMB header. The domain name and the account name may be integrally handled. Further, the host name of the computer 101 corresponding to the requesting side may be extracted from the SMB header, and added to auxiliary information. Further, an authentication method may be added to the authentication type or the attribute data.

In this way, with regard to authentication, the contents are recorded in the authentication log. Meanwhile, with respect to a non-authentication command, the contents are recorded in the operation log. Hereinafter, an example of a request message and an operation log about the non-authentication command will be described.

There is a case where the request message is sent once and a process is completed, and a case where the request message is sent a plurality of times until the process of a command is completed, depending on the type of a command. Examples described below all correspond to the case where the request message is sent a plurality of times.

Figure 7A:
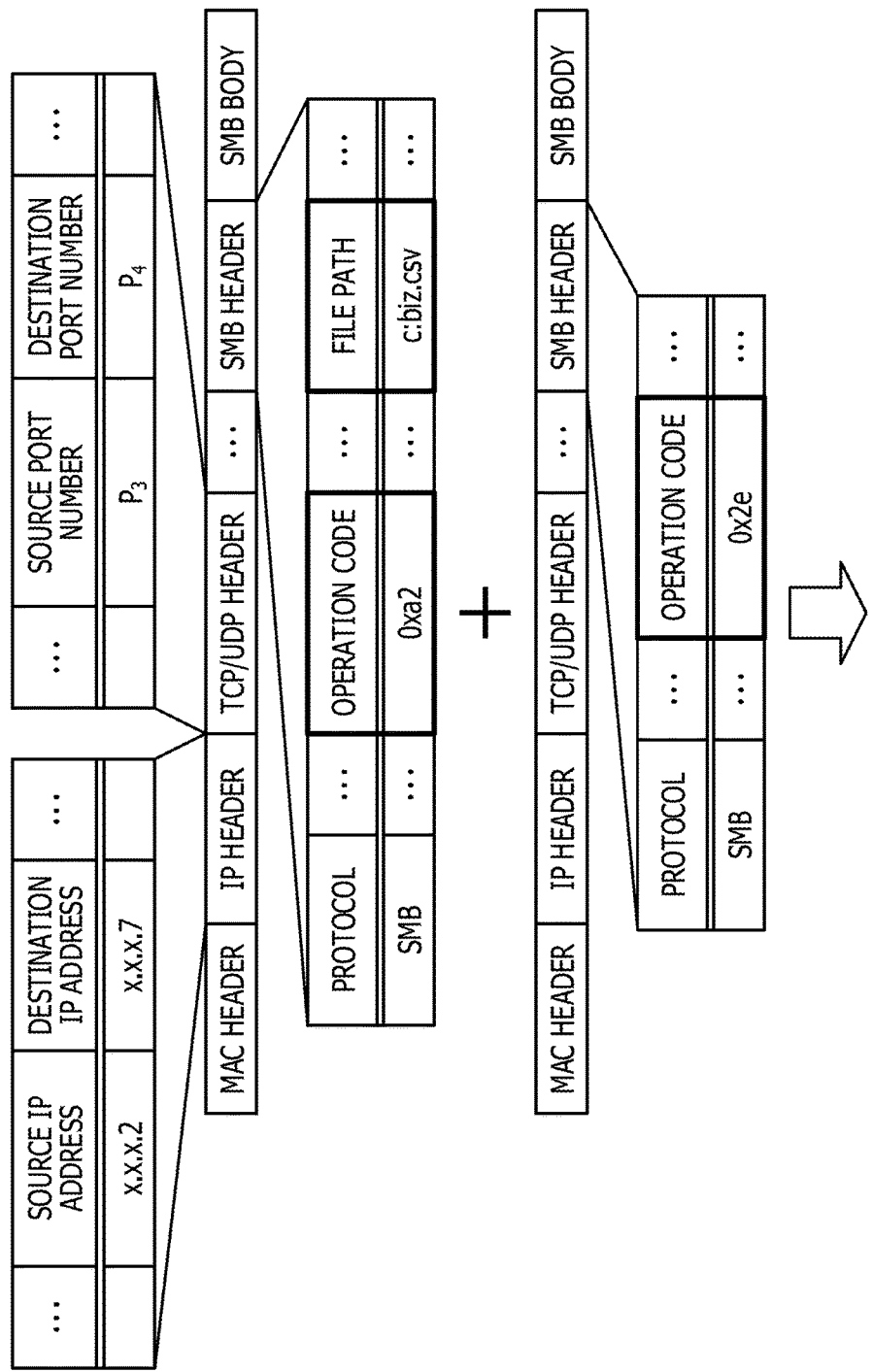
FIG. 7A is a diagram illustrating an example of a request message for file read.
Figure 7B:
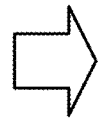
FIG. 7B is a diagram illustrating an example of an operation log for file read.

FIGS. 7A and 7B illustrate examples of a request message and an operation log for file read. For example, in a case where data is stolen from the target computer 205, the malware 201 may send directly or indirectly a file read request message to the file access service unit 303.

It is assumed that a first file read request message illustrated in the upper part of FIG. 7A is sent from the computer 101 of an IP address "x.x.x.2" to the computer 101 of an IP address "x.x.x.7". Thus, "x.x.x.2" is set in the source IP address field and "x.x.x.7" is set in the destination IP address field. The same is also applied in the case of a second file read request message illustrated in the lower part of FIG. 7A.

It is assumed that the first file read request message illustrated in the upper part of FIG. 7A is sent to the port of the port number "$P_4$" of the destination computer 101 from the port of the port number "$P_3$" of the source computer 101. Thus, "$P_3$" is set in the source port number field, and "$P_4$" is set in the destination port number field. Incidentally, the same is also applied in the case of the second file read request message illustrated in the lower part of FIG. 7A.

It is assumed that a procedure of file read in this example conforms to an SMB version 1. Therefore, "SMB" is set in the protocol field.

"0xa2" of the operation code in the first request message is referred to as NTCreate. The operation code in the case of the SMB version 1 is 1 byte. An operation code "0x01" in the first request message means a file access request. An operation code "0x2e" in the second request message indicates that the type of file access is file read.

In a case where the operation code set in the first request message is "0xa2", and the operation code set in the second request message (the protocol, the source IP address, the source port number, the destination IP address, and the destination port number are common to in the first request message) is "0x2e", it is determined that these request messages are to request file read.

As described above, in a case where the monitoring device 103 detects a packet corresponding to the non-authentication request message, the contents of the request message are recorded in the operation log. A new record indicating the contents of the file read request message illustrated in the upper part and the lower part of FIG. 7A is provided in the operation log illustrated in FIG. 7B.

The operation log in this example is a table format. A record corresponding to a command other than SMB authentication or DCE/RPC authentication is provided in the operation log. The record of the operation log has a field for setting date and time, a field for setting a source IP address, a field for setting a source port number, a field for setting a destination IP address, a field for setting a destination port number, a field for setting commands and options, and a field for setting attribute data. The date and time, the source IP address, the destination IP address, the source port number and the destination port number are the same as in the case of the authentication log.

Options for the command are optional. In other words, options may be omitted in some cases. In a case where the option is omitted, the command is set, but the option is not set in the field for setting the commands and options. In this example, a command name "file read" is set, and the option is omitted.

Similar to the case of the authentication log, attribute items and attribute parameters are set in pairs in the attribute data field. The attribute items may vary depending on the command (or a combination of a command and an option). In this example, a file read attribute item is a file path and an account name. A file path contains the storage location and the name of the file to be read. The account name represents a file read request source. However, the file read attribute items are not limited to this example. The file path is extracted from the SMB header of the first request message. The account name is specified in the authentication stage.

Figure 8A:
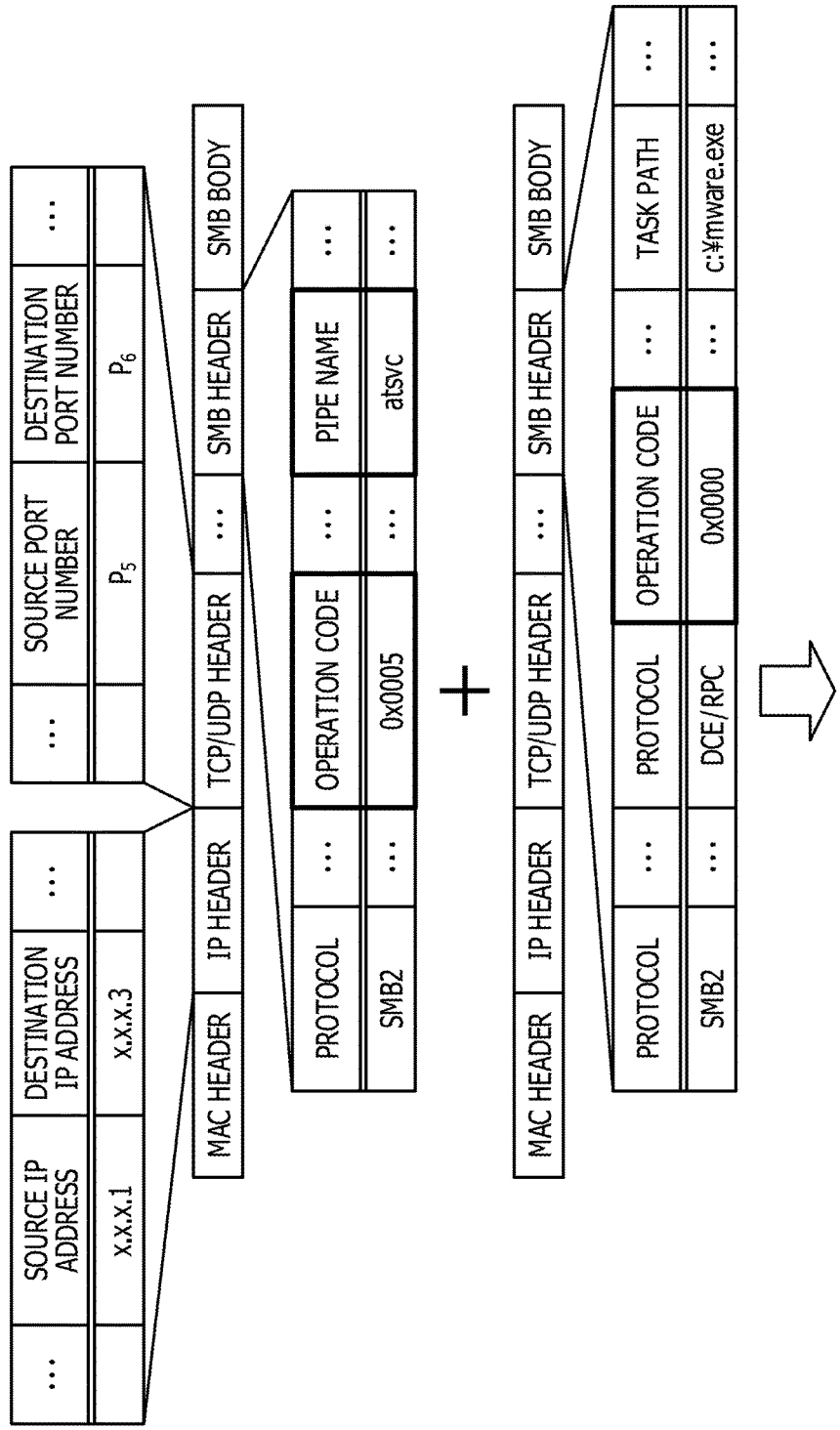
FIG. 8A is a diagram illustrating an example of a request message for task registration.
Figure 8B:
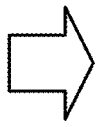
FIG. 8B is a diagram illustrating an example of an operation log for task registration.

FIGS. 8A and 8B illustrate an example of a request message and an operation log for task registration. In a case where a desired task is operated by a target computer 205, the malware 201 may send a request message for task registration to a target computer 205.

It is assumed that a first request message for task registration illustrated in the upper part of FIG. 8A is sent from the computer 101 of an IP address "x.x.x.1" to the computer 101 of an IP address "x.x.x.3". Thus, "x.x.x.1" is set in the source IP address field and "x.x.x.3" is set in the destination IP address field. The same is also applied in the case of a second request message for file read illustrated in the lower part of FIG. 8A.

It is assumed that a procedure of task registration in this example conforms to an SMB version 2. Therefore, "SMB2" is set in the protocol field.

In a case where the operation code set in the first request message is "0x0005", the pipe name which is set in the same packet is "atsvc", and the operation code set in the second request message (the protocol, the source IP address, the source port number, the destination IP address, and the destination port number are common to those in the first request message) is "0x0000", it is determined that these request messages are to request task registration. The operation code in the case of the version 2 SMB is 2 bytes.

A new record indicating the contents of the request message for the task registration illustrated in the upper and lower parts of FIG. 8A is provided in the operation log illustrated in FIG. 8B.

The date and time, the source IP address, the destination IP address, the source port number and the destination port number are as described above.

In this example, a command name "task registration" is set in the command and option field, and the option is omitted.

In this example, the attribute items for task registration are a task path and an account name. The task path includes the storage location and the name of a file which is executed as a task. The account name indicates a request source of task registration. However, the attribute items for task registration are not limited to this example. The task path is extracted from the SMB header of the second request message. The account name is specified in the authentication stage.

Figure 9B:
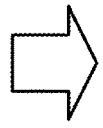
FIG. 9B is a diagram illustrating an example of an operation log for service registration.

In addition, FIG. 9A and FIG. 9B illustrate an example of a request message and an operation log of service registration. In a case where a service is attempted to be used in the target computer 205, the malware 201 may send a request message for service registration to the target computer 205.

It is assumed that a first request message for service registration illustrated in the upper part of FIG. 9A is sent from the computer 101 of an IP address "x.x.x.1" to the computer 101 of an IP address "x.x.x.4". Thus, "x.x.x.1" is set in the source IP address field and "x.x.x.4" is set in the destination IP address field. The same is also applied in the case of a second request message for service registration illustrated in the lower part of FIG. 9A.

It is assumed that a procedure of service registration in this example conforms to DCE/RPC. Therefore, "DCE/RPC" is set in the protocol field.

In a case where the first operation code set in the first request message is "0x0b", a service UUID is "9844 . . . 1003", and the second operation code set in the second request message (the protocol, the source IP address, the source port number, the destination IP address, and the destination port number are common to those in the first request message) is "0x0c00", it is determined that these request messages are to request service registration.

A new record indicating the contents of the request message for the service registration illustrated in the upper and lower parts of FIG. 9A is provided in the operation log illustrated in FIG. 9B.

The date and time, the source IP address, the destination IP address, the source port number and the destination port number are as described above.

In this example, a command name "service registration" is set in the command and option field, and the option is omitted.

In this example, the attribute items for service registration are a service name and an account name. The service name is the name of the available service. The account name indicates a request source of service registration. However, the attribute items for service registration are not limited to this example. The service name is extracted from the SMB header of the second request message. The account name is specified in the authentication stage.

In the case of other commands, the attribute data set in the request message is specified according to a predetermined rule in response to each command. Further, the option as well as the command may be specified according to a predetermined rule in some cases. A specified command or a combination of the command and options is set in the operation log. Furthermore, the attribute data is extracted from the request message, and is recorded in the operation log, depending on the specified command or the combination of the command and options, according to a predetermined rule.

Here, an example of providing the authentication log separately from the operation log is exemplified, and the authentication log and the operation log may be integrally handled. In this case, the authentication type of the authentication log may be set in the command and option field of the record of the operation log. This concludes the description of the relationship between the various types of request messages and logs.

A description will be moved to the monitoring device 103. FIG. 10 illustrates a configuration example of modules of the monitoring device 103. The monitoring device 103 includes a logger 1001, an authentication log storage unit 1009, and an operation log storage unit 1011. The logger 1001 performs logging based on a SMB or DCE/RPC request message.

The logger 1001 includes a capture unit 1003, a packet storage unit 1004, an analysis unit 1005, a record processing unit 1007, and a rule storage unit 1008. The capture unit 1003 captures a packet transmitted over a network. The packet storage unit 1004 stores the captured packet. The analysis unit 1005 analyzes the packet based on a predetermined rule. The record processing unit 1007 executes a first recording process to a third recording process which will be described below.

The rule storage unit 1008 stores a rule for associating the combination of an operation code and a pipe name (or one of the operation code and the pipe name) with the command of a remote operation (or a combination of a command and an option), with respect to the SMB protocol. The rule storage unit 1008 stores a rule for associating the combination of an operation code and a service UUID (or one of the operation code and the service UUID) with the command of the remote operation (or a combination of the command and the option), with respect to the DCE/RPC protocol. The rule storage unit 1008 also stores a rule defining an attribute item corresponding to a command and the storage location of the attribute data. In the case of the SMB packet, the storage position of the attribute data represents a predetermined position of the SMB header or a predetermined position of the SMB body. In the case of a DCE/RPC packet, the storage position of the attribute data represents a predetermined position of the DCE/RPC header or a predetermined position of the DCE/RPC body.

The authentication log storage unit 1009 stores the authentication log. The operation log storage unit 1011 stores the operation log.

In addition, the monitoring device 103 includes a detection unit 1013, a configuration storage unit 1015, a determination unit 1017, an infection list storage unit 1027, a target list storage unit 1029, and an output unit 1031. The detection unit 1013 detects the infected computer 203 using the related art. The configuration storage unit 1015 stores configuration data of the information processing system. The configuration data of the information processing system contains, for example, the IP address, the MAC address, or the host name of each computer 101. The determination unit 1017 performs a first determination process to a third determination process.

The determination unit 1017 includes a receiving unit 1019, a specifying unit 1021, an extraction unit 1023, and a search unit 1025. The receiving unit 1019 receives an alert from the detection unit 1013. The specifying unit 1021 specifies various types of data. The extraction unit 1023 extracts, for example, the attribute parameters (for example, an account name, a file name, or a service name) from the record of the authentication log or the operation log. The search unit 1025 retrieves the records from the authentication log or the operation log, using an attribute parameter as a search key.

The infection list storage unit 1027 stores the infection list. The target list storage unit 1029 stores the target list. The output unit 1031 outputs an infection list and/or a target list.

The logger 1001, the capture unit 1003, the analysis unit 1005, the record processing unit 1007, the detection unit 1013, the determination unit 1017, the receiving unit 1019, the specifying unit 1021, the extraction unit 1023, the search unit 1025, and the output unit 1031, which are described above, are implemented using a hardware resource (for example, FIG. 30) and a program causing a processor to execute the process described below.

Figure 30:
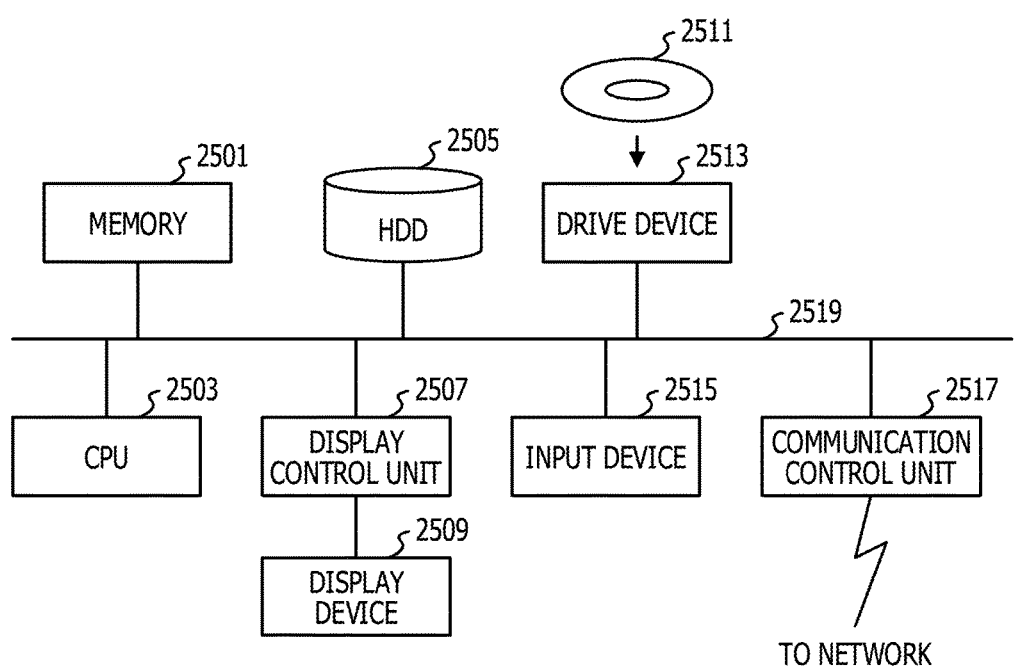
FIG. 30 is a functional block diagram of a computer.

The packet storage unit 1004, the rule storage unit 1008, the authentication log storage unit 1009, the operation log storage unit 1011, the configuration storage unit 1015, the infection list storage unit 1027, and the target list storage unit 1029, which are described above, are implemented using a hardware resource (for example, FIG. 30).

Incidentally, the detection unit 1013 may be provided outside the monitoring device 103. For example, a detection server having the detection unit 1013 may be provided inside the information processing system. In that case, the receiving unit 1019 may receive alerts from the detection unit 1013 provided in the detection server, over a network.

Figure 11:
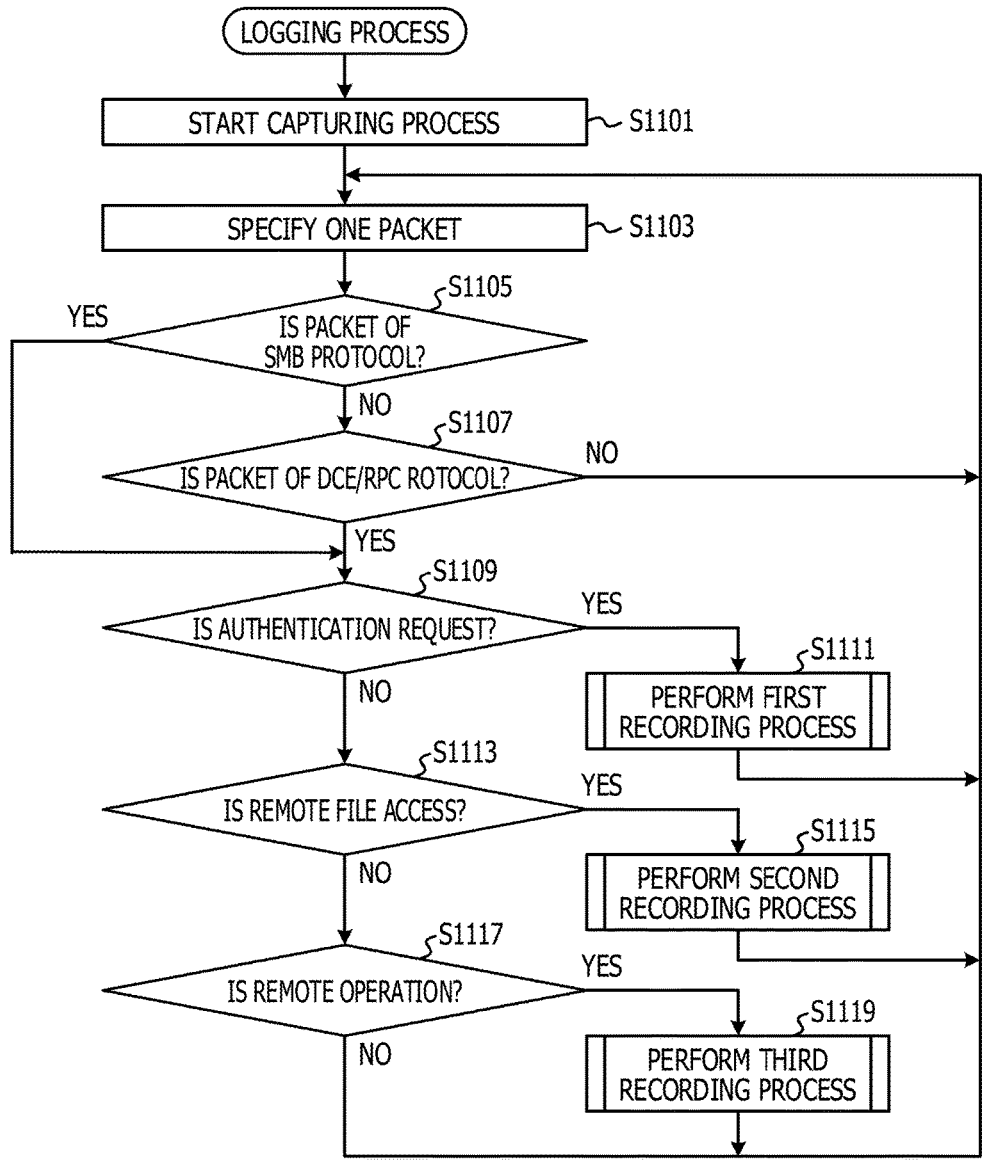
FIG. 11 is a diagram illustrating an example of a logging process flow.

Subsequently, the process by the monitoring device 103 will be described. In this example, the monitoring device 103 normally performs a logging process. FIG. 11 illustrates an example of the logging process flow. The capture unit 1003 starts a capturing process (S1101). In the capturing process, the capture unit 1003 acquires a packet transmitted over the network, through a switch or a network tap, which enables port mirroring, provided between the monitoring device 103 and the network. The acquired packet is stored in the packet storage unit 1004. The capture unit 1003 may assign the date and time when the packet is captured, to the captured packet.

The analysis unit 1005 specifies one unprocessed packet, among the captured packets (S1103). The analysis unit 1005 specifies packets, for example, in order of capturing. The analysis unit 1005 may discard the analyzed packet. In a case where an unprocessed packet is not present, the analysis unit 1005 waits for the next packet to be captured.

The analysis unit 1005 determines whether or not the specified packet is an SMB packet (S1105). Specifically, in a case where data indicating that the protocol is SMB is set in the packet, the analysis unit 1005 determines that the packet is the SMB packet.

In a case where it is determined that the specified packet is the SMB packet, the packet is a log target, and thus the process proceeds to a process of S1109.

Meanwhile, in a case where it is determined that the specified packet is not the SMB packet, the analysis unit 1005 determines whether or not the packet specified in S1103 is a DCE/RPC packet (S1107). Specifically, in a case where data indicating that the protocol is DCE/RPC is set in the packet, the analysis unit 1005 determines that the packet is the DCE/RPC packet.

In a case where it is determined that the packet is the DCE/RPC packet, the packet is a log target, and thus the process proceeds to a process of S1109.

Meanwhile, in a case where it is determined that the packet is not the DCE/RPC packet, the packet is not the target packet, such that the process returns to the process of S1103, and the above process is repeated. For example, a packet of a hypertext transfer protocol (HTTP) and a packet of a file transfer protocol (FTP) are not log targets in this example.

The analysis unit 1005 determines whether or not the packet specified in S1103 corresponds to an authentication request message (S1109).

Specifically, in a case where an authentication operation code (SessionSetup) is set in the SMB header, the analysis unit 1005 determines whether or not the packet corresponds to a request message for SMB authentication. Further, in a case where an authentication operation code (AUTH3) is set in the DCE/RPC header, the analysis unit 1005 determines that the packet corresponds to a request message for DCE/RPC authentication.

In a case where it is determined that the packet corresponds to the request message for authentication, the record processing unit 1007 performs a first recording process (S1111).

Figure 12:
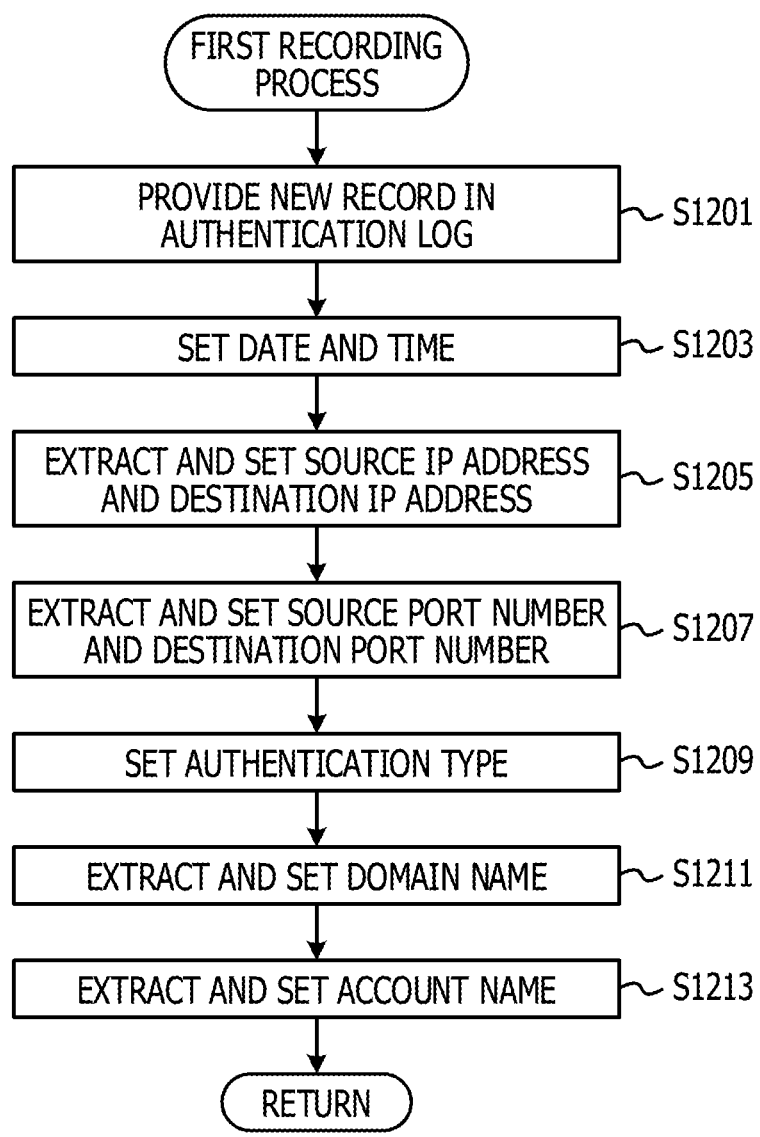
FIG. 12 is a diagram illustrating a first recording process flow.

FIG. 12 illustrates an example of the first recording process flow. The record processing unit 1007 provides a new record in the authentication log (S1201). The record processing unit 1007 sets the date and time when the packet specified in S1103 is captured in a new record (S1203).

The record processing unit 1007 extracts a source IP address and a destination IP address from the IP header of the packet, and sets the extracted source IP address and destination IP address, in the new record (S1205). In addition, the record processing unit 1007 extracts the source port number and the destination port number from the UDP/TCP header of the packet, and sets the extracted source port number and destination port number in the new record (S1207).

The record processing unit 1007 sets the authentication type (SMB authentication or DCE/RPC authentication) which is determined in S1109, in the new record (S1209).

The record processing unit 1007 extracts a domain name from the SMB header or the DCE/RPC header of the packet, and sets the extracted domain name, in the attribute data field of the new record (S1211). In addition, the record processing unit 1007 extracts the account name from the SMB header or the DCE/RPC header of the packet, and sets the extracted account name, in the attribute data field of the new record (S1213). If the first recording process is completed, the process returns to the process of S1103 illustrated in FIG. 11, and the process described above is repeated.

A description will be made again with reference to FIG. 11. In S1109, in a case where it is determined that the packet specified in S1103 does not correspond to the authentication request message, the analysis unit 1005 determines whether or not the packet corresponds to request message for remote file access (S1113). Specifically, in a case where the operation code (NTCreate) for remote file access is set in the SMB header, the analysis unit 1005 determines that the packet corresponds to the request message for remote file access. In addition, the remote file access is established by a plurality of request messages. Thus, it is determined that a packet (hereinafter, referred to as a second request packet) subsequent to a packet in which NTCreate is set (hereinafter, referred to as a first request packet) also corresponds to the request message for remote file access, according to a predetermined sequence of remote file access. In addition, in a case of a DCE/RPC packet, there is no packet corresponding to the request message for remote file access.

In a case where it is determined that the packet corresponds to the request message for remote file access, the record processing unit 1007 performs a second recording process (51115).

Figure 13:
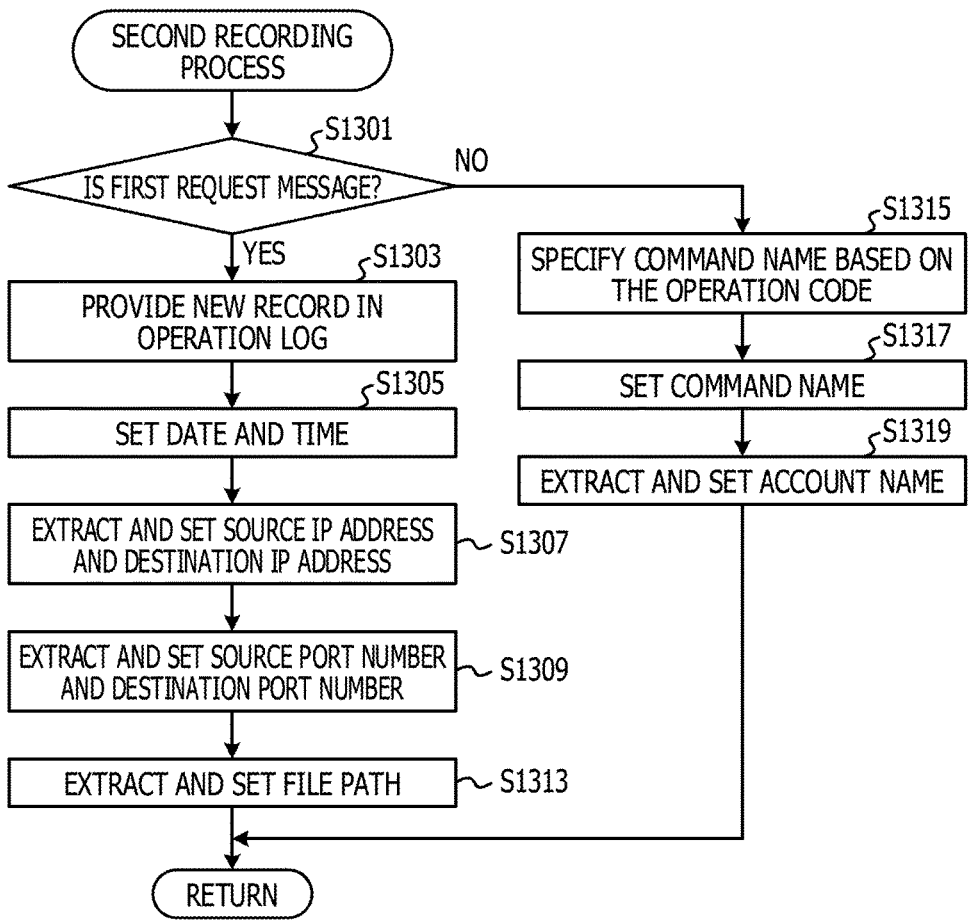
FIG. 13 is a diagram illustrating a second recording process flow.

FIG. 13 illustrates an example of the second recording process flow. In the second recording process, the data based on the first request message and the second request message is set in the operation log. The analysis unit 1005 determines whether or not the packet specified in S1103 is a packet in which the operation code (NTCreate) is set, that is, the first request message (S1301).

In a case where it is determined that the packet is the first request message, the record processing unit 1007 sets a new record in the operation log (S1303). The record processing unit 1007 sets the date and time when the packet is captured in the new record (S1305).

The record processing unit 1007 extracts the source IP address and the destination IP address from the IP header of the packet, and sets the extracted source IP address and destination IP address in the new record (S1307). In addition, the record processing unit 1007 extracts the source port number and the destination port number from the TCP header or the UDP header of the packet, and sets the extracted source port number and destination port number, in the new record (S1309).

The record processing unit 1007 extracts the file path from the SMB header of the packet, and sets the extracted file path, in the attribute data field of the new record (S1313). This concludes the configuration of the data based on the first request message. The process first returns to the process of S1103 illustrated in FIG. 11, and the process described above is repeated.

Meanwhile, in S1301, in a case where it is determined that the packet is not the first request message, in other words, the packet is the second request message, the analysis unit 1005 specifies a command name based on the operation code (S1315). For example, if the operation code is "0x2e", a file read command is specified. The record processing unit 1007 sets the specified command name in a record in which data is set based on the first request message (S1317).

The record processing unit 1007 extracts the account name specified in an authentication step (a process of S1213 illustrated in FIG. 12) from the authentication log, and sets the extracted account name, in the attribute data field of the record in which data is set based on the first request message (S1319). The record processing unit 1007 may associate the record with the record of the authentication log. The process returns to the process of S1103 illustrated in FIG. 11, and the process described above is repeated.

A description will be made again with reference to FIG. 11. In S1113, in a case where it is determined that the packet specified in S1103 does not correspond to the request message for remote file access, the analysis unit 1005 determines whether or not the packet corresponds to a request message for a remote operation (except for remote file access) (S1117). Specifically, in a case where a combination of the operation code and the pipe name which is set in the SMB header (or one of the operation code and the pipe name) matches any pattern that is assumed as the remote operation, the analysis unit 1005 determines that the packet corresponds to the request message for a remote operation. In addition, in a case where a combination of the operation code and the service UUID which is set in the DCE/RPC header (or one of the operation code and the service UUID) matches any pattern that is assumed as the remote operation, the analysis unit 1005 determines that the packet corresponds to the request message for a remote operation.

In a case where the packet is determined to correspond to the request message for a remote operation, the record processing unit 1007 performs the third recording process (S1119).

In this example, it is assumed that the remote operation is established by one request message. However, some remote operations may be established by a plurality of request messages, similar to the case of the remote file access. In this case, similar to the case of remote file access, the process is divided into a plurality of times of processes. In other words, it is assumed that the first request message and the second request message (may include third and subsequent request messages in some cases) respectively correspond to the request message for a remote operation.

Figure 14:
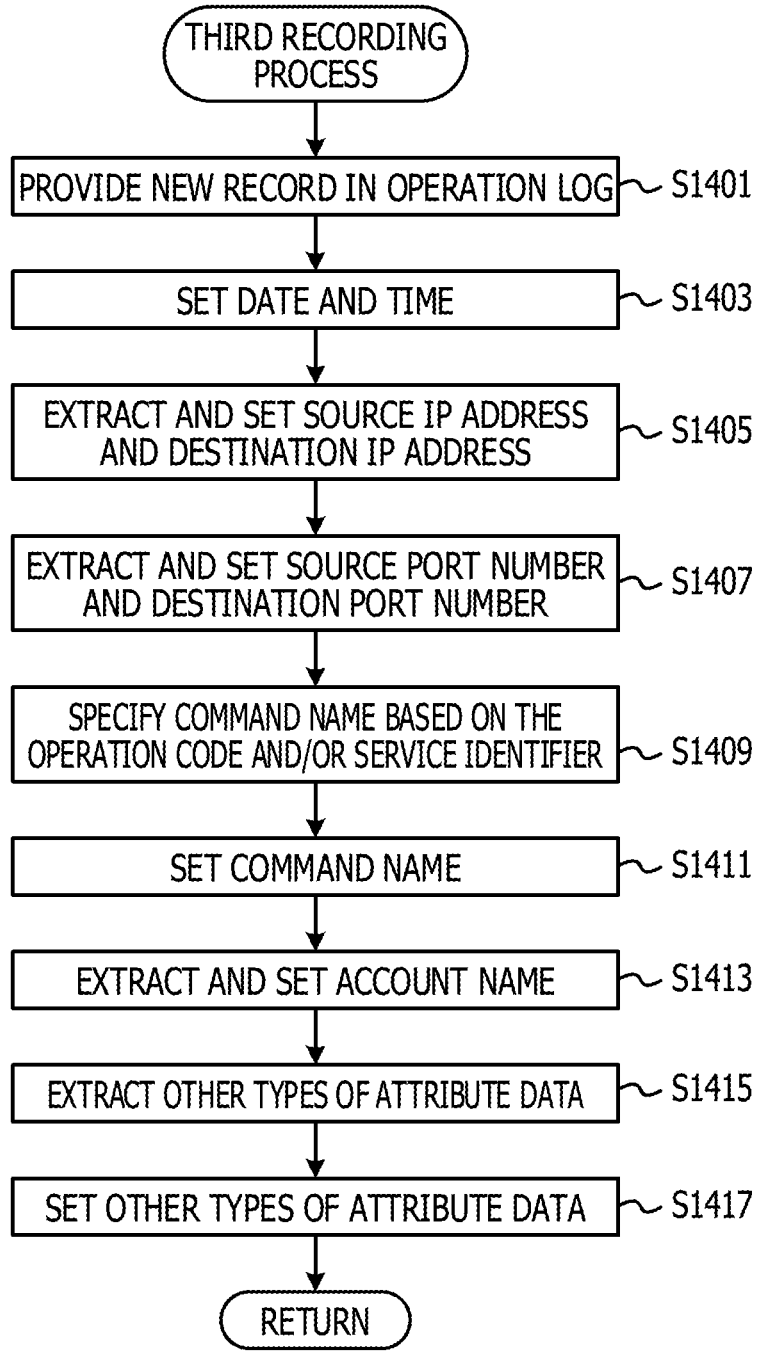
FIG. 14 is a diagram illustrating an example of a third recording process flow.

FIG. 14 illustrates an example of a third recording process flow. The record processing unit 1007 provides a new record in the operation log (S1401). The record processing unit 1007 sets the date and time when the packet is captured in a new record (S1403).

The record processing unit 1007 extracts the source IP address and the destination IP address from the IP header of the packet, and sets the extracted source IP address and destination IP address, in the new record (S1405). In addition, the record processing unit 1007 extracts the source port number and the destination port number from the UDP/TCP header of the packet, and sets the extracted source port number and destination port number, in the new record (S1407).

The record processing unit 1007 specifies a command name based on the operation code and/or the service identifier (S1409). Specifically, in the case of the SMB packet, the record processing unit 1007 specifies a command name for a remote operation (or a combination of a command name and an option) corresponding to the combination of an operation code and a pipe name (or one of the operation code and the pipe name), according to a predetermined rule. Further, in the case of the DCE/RPC packet, the record processing unit 1007 specifies a command name for a remote operation (or a combination of a command name and an option) corresponding to the combination of an operation code and a service UUID (or one of the operation code and the service UUID), according to a predetermined rule.

The record processing unit 1007 sets the specified command name (or the combination of a command name and an option) in the new record (S1411).

In a case where the command name (or the combination of a command name and an option) is specified by the first request message and the second request message (may include third and subsequent request messages in some cases), similar to the case of the second recording process, the command name (or the combination of a command name and an option) is specified at the stage of performing a process for a subsequent request message.

The record processing unit 1007 extracts the account name specified in an authentication step (a process of S1213 illustrated in FIG. 12) from the authentication log, and sets the extracted account name, in the attribute data field of the new record (S1413). The record processing unit 1007 may associate a new record with the record of the authentication log.

The analysis unit 1005 extracts attribute data other than the account name, according to a predetermined rule based on the command name (or the combination of a command name and an option) specified in S1409 (S1415). The record processing unit 1007 sets the extracted attribute data, in the attribute data field of the new record (S1417).

The analysis unit 1005 may acquire the attribute data from the SMB body or the DCE/RPC body. Further, in a case where there is no attribute data to be extracted, the process of S1415 and S1417 may be omitted.

In a case where attribute data to be extracted is included in the second request message (may include third and subsequent request messages in some cases), the process of S1415 and S1417 may be performed at the stage of performing a process for a subsequent request message.

In a case of performing analysis on the subsequent request message, the order of the request message may be determined, and a process according to each order may be performed. If the third recording process is ended, the process returns to the process of S1103 illustrated in FIG. 11, and the process described above is repeated.

A description will be made again with reference to FIG. 11. In S1117, in a case where the packet specified in S1103 is not determined to correspond to the request message for a remote operation, the packet is not considered to correspond to the log target. Therefore, the process returns to the process of S1103 as it is, and the process described above is repeated. This concludes the description of the logging process.

The following describes a main process. In this example, the main process is executed in parallel with the logging process.

Figure 15:
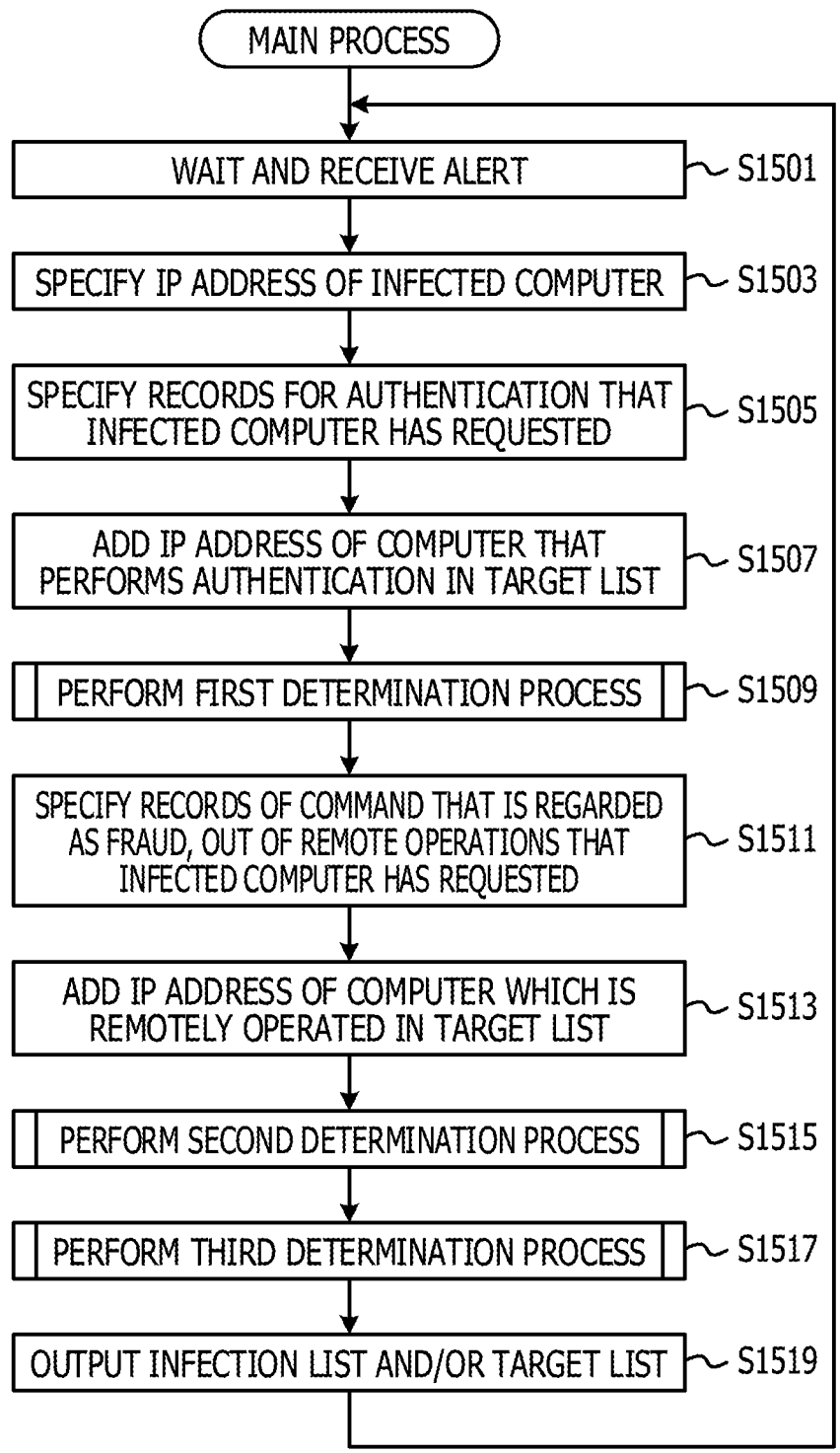
FIG. 15 is a diagram illustrating an example of a main process flow.

FIG. 15 illustrates an example of a main process flow. The receiving unit 1019 is on standby and receives an alert notifying of the detection of the infected computer 203 (S1501). In this example, it is assumed that the alert contains data specifying the infected computer 203 (for example, an IP address, a MAC address, or a host name).

The receiving unit 1019 may receive the time range for specifying the logs which are determination targets, as well as data specifying the infected computer 203. The time range is, for example, a time period before and after the time when infection is detected. Alternatively, the time range may be any of a time period before the time when infection is detected or a time period after the time. The time range may be set, for example, by an administrator. Further, a time range may be determined according to the content of alert.

Incidentally, a trigger for starting S1503 and subsequent process is not limited to the reception of the alert. For example, S1503 and subsequent process may be started by the operation of the administrator. Further, data specifying the infected computer 203 may be received, by those other than an alert. For example, the data specifying the infected computer 203 may be received, by the operation of the administrator.

In a case where an identifier other than the IP address, for example, a MAC address or a host name is included in the alert, the specifying unit 1021 specifies the IP address of the infected computer 203 which corresponds to the identifier, based on the configuration data of the information processing system (S1503).

The specifying unit 1021 specifies the records for authentication that the infected computer 203 has requested, among the records included in the authentication log (S1505).

FIG. 16 illustrates an example of the records for authentication that the infected computer 203 has requested. In this example, it is assumed that the computer 101 of the IP address "x.x.x.1" is detected as the infected computer 203 by the detection unit 1013, and records are specified in which the IP address "x.x.x.1" of the infected computer 203 is set in the source IP address, in the process of S1505.

This record indicates that the infected computer 203 makes a request for SMB authentication to the computer 101 of the IP address "x.x.x.2". In addition, in this SMB authentication, a domain name "DomA" and an account name "adminX" are used. In this example, in a case where the SMB authentication is assumed to be due to attack of the malware 201, the malware 201 is likely to similarly use the domain name "DomA" and the account name "adminX" in attacks against other computers 101. The following description will be made regarding an example in which the traces of similar attacks are explored by focusing on the account name "adminX". In addition, the destination port number and the source port number are as illustrated, and thus the description thereof is omitted.

A description will be made again with reference to FIG. 15. The specifying unit 1021 adds the destination IP address that is set in the record, that is, the IP address of the computer 101 that performs authentication to the target list (S1507). The specifying unit 1021 may add the destination port number that is set in the record, in addition to the IP address, to the target list. The specifying unit 1021 may configure the target list such that the IP addresses do not overlap. Alternatively, the specifying unit 1021 may record the number of times that the IP addresses overlap in the target list.

The determination unit 1017 performs the first determination process (S1509). In the first determination process, the determination unit 1017 determines the infected computer 203 and the target computer 205, based on the account name.

Figure 17A:
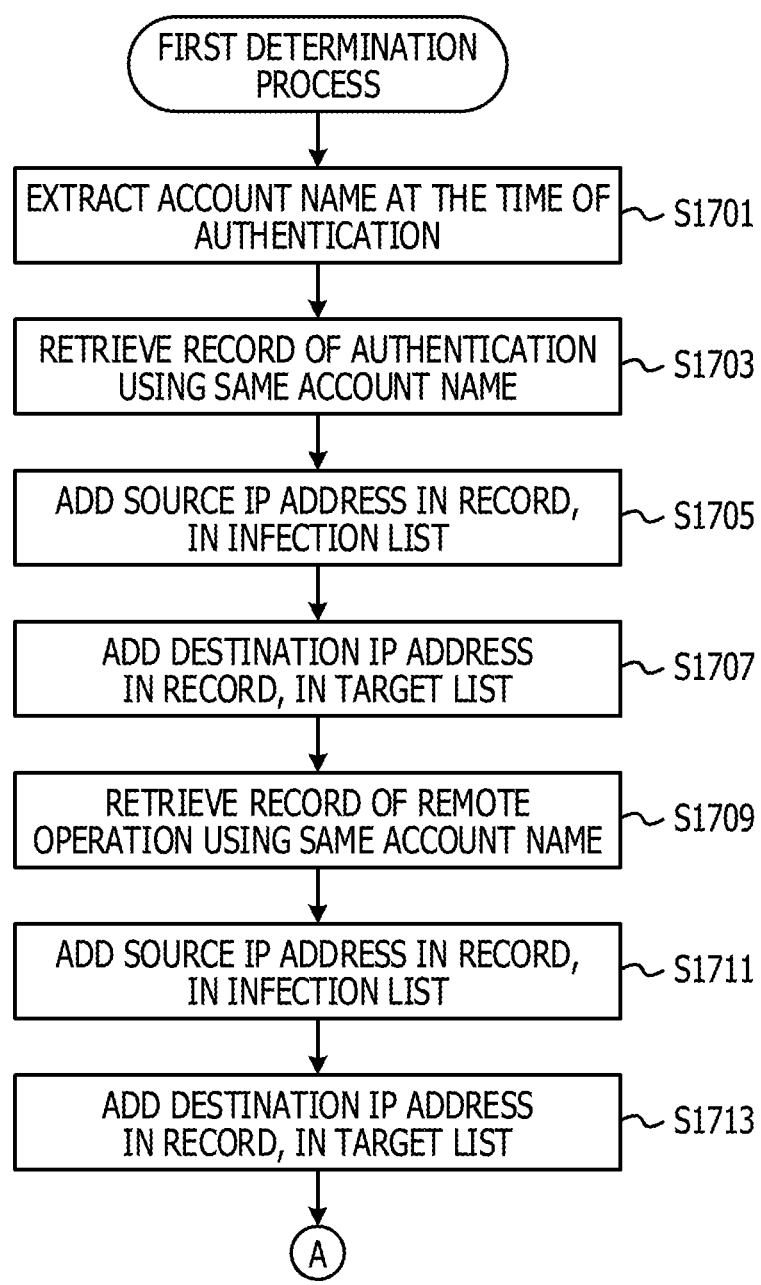
FIG. 17A is a diagram illustrating an example of a first determination process flow.
Figure 17B:
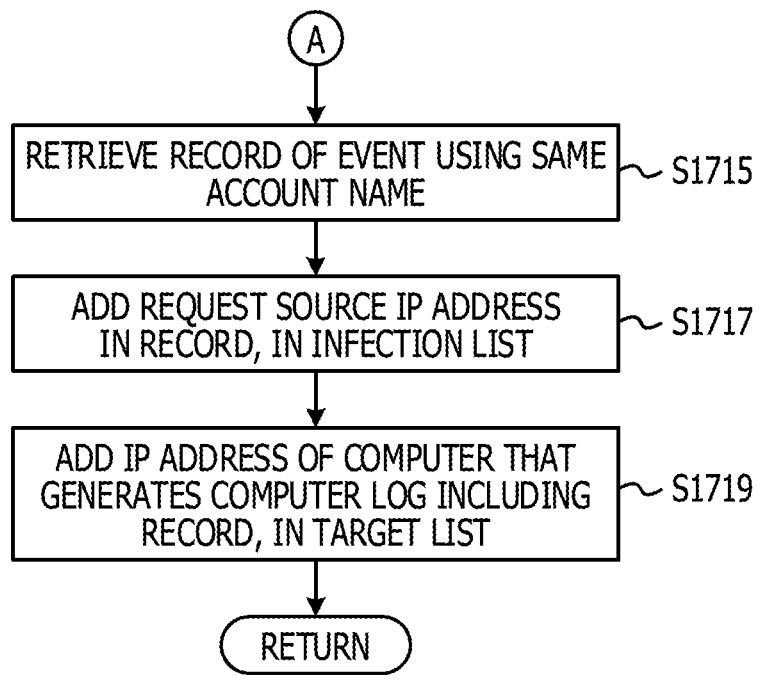
FIG. 17B is a diagram illustrating an example of the first determination process flow.

FIGS. 17A and 17B illustrate an example of a first determination process flow. The extraction unit 1023 extracts an account name at the time of authentication, from the record specified in S1505 (S1701). The search unit 1025 retrieves a record for authentication using the same account name as the extracted account name, from the authentication log (S1703). In a case of receiving the time range at S1501 illustrated in FIG. 15, the search unit 1025 may not use a record for authentication performed at the date and time which are not included in the time range as a search target.

FIG. 18 illustrates an example of a record for authentication using the same account name as at the time of unauthorized authentication. In this example, it is assumed that a record, in which the account name "adminX" specified based on the record illustrated in FIG. 16 is set in the attribute data field, is retrieved, at S1703, and three records are obtained as a search result.

The first record is the same as the record illustrated in FIG. 16. The second record and the third record are newly specified.

The second record indicates that the computer 101 of the IP address "x.x.x.2" makes a request for SMB authentication to the computer 101 of the IP address "x.x.x.5", using the same "adminX" as the account name used by the infected computer 203. There is a doubt that the request for SMB authentication in this case is due to an attack by the malware 201 of the same type as that of the malware 201 hidden in the infected computer 203 which is detected by the detection unit 1013. Therefore, it is estimated that the computer 101 of the IP address "x.x.x.2" is the infected computer 203 which is in hiding, and the computer 101 of the IP address "x.x.x.5" is the target computer 205 which is in hiding. Since the accuracy of estimation depends on the characteristics of the malware 201 in some aspects, the accuracy of estimation is not described further. In addition, the same is applied to the estimation to be described later.

The third record indicates that the computer 101 of the IP address "x.x.x.3" makes a request for DCE/RPC authentication on the computer 101 of the IP address "x.x.x.6", using the same "adminX" as the account name used by the infected computer 203. There is a doubt that the request for DCE/RPC authentication in this case is due to an attack by the malware 201 of the same type as that of the malware 201 hidden in the infected computer 203 which is detected by the detection unit 1013, similar to the second record. Therefore, it is estimated that the computer 101 of the IP address "x.x.x.3" is the infected computer 203 which is in hiding, and the computer 101 of the IP address "x.x.x.6" is the target computer 205 which is in hiding.

A description will be made again with reference to FIG. 17A. The specifying unit 1021 adds the source IP address that is set in the record retrieved in S1703 of FIG. 17A, in the infection list (S1705). In a case where a plurality of records are retrieved, the specifying unit 1021 adds the source IP address that is set in each record, in the infection list. The specifying unit 1021 may add the source port number, in addition to the IP address, in the infection list.

The specifying unit 1021 may configure the infection list such that the IP addresses do not overlap. Alternatively, the specifying unit 1021 may record the number of times that the IP addresses overlap in the infection list.

The specifying unit 1021 adds the destination IP address that is set in the record, which is retrieved in S1703 of FIG. 17A, to the target list (S1707). In a case where a plurality of records are retrieved, the specifying unit 1021 adds the destination IP address that is set in each record, in the infection list. The specifying unit 1021 may add the destination port number, in addition to the IP address, to the target list. The specifying unit 1021 may configure the infection list such that the IP addresses do not overlap. Alternatively, the specifying unit 1021 may record the number of times that the IP addresses overlap, in the infection list.

In addition, the search unit 1025 retrieves a record for the remote operation using the same account name as the account name that has been extracted in S1701, from the operation log (S1709). In a case of receiving the time range in S1501 illustrated in FIG. 15, the search unit 1025 may not use a record for the remote operation executed at the date and time which are not included in the time range as a retrieval target.

Figure 19:
FIG. 19 is a diagram illustrating an example of a record for a remote operation using the same account name as at the time of unauthorized authentication.

FIG. 19 illustrates an example of a record for a remote operation using the same account name as at the time of unauthorized authentication. In this example, it is assumed that a record, in which the account name "adminX" specified based on the record illustrated in FIG. 16 is set in the attribute data field, is retrieved, at S1709, and three records are obtained as a search result.

The first record indicates that the computer 101 of the IP address "x.x.x.2" performs a file read on the computer 101 of the IP address "x.x.x.7", using the same "adminX" as the account name used by the infected computer 203. There is a doubt that the file read in this case is due to an attack by the malware 201 of the same type as that of the malware 201 hidden in the infected computer 203 which is detected by the detection unit 1013. Therefore, it is estimated that the computer 101 of the IP address "x.x.x.2" is the infected computer 203 which was in hiding, and the computer 101 of the IP address "x.x.x.7" is the target computer 205 which was in hiding.

The second record indicates that the computer 101 of the IP address "x.x.x.1" performs a task registration on the computer 101 of the IP address "x.x.x.3", using the same "adminX" as the account name used by the infected computer 203. There is a doubt that the task registration in this case is due to an attack by the malware 201 hidden in the infected computer 203 which is detected by the detection unit 1013. Therefore, it is estimated that the computer 101 of the IP address "x.x.x.3" is the target computer 205 which was in hiding.

The third record indicates that the computer 101 of the IP address "x.x.x.5" performs a file write on the computer 101 of the IP address "x.x.x.9", using the same "adminX" as the account name used by the infected computer 203. There is a doubt that the file write in this case is due to an attack by the malware 201 of the same type as that of the malware 201 hidden in the infected computer 203 which is detected by the detection unit 1013. Therefore, it is estimated that the computer 101 of the IP address "x.x.x.5" is the infected computer 203 which was in hiding, and the computer 101 of the IP address "x.x.x.9" is the target computer 205 which was in hiding.

A description will be made again with reference to FIG. 17A. The specifying unit 1021 adds the source IP address which is set in the retrieved record, in the infection list, similar to the case of the process of S1705 (S1711). In a case where a plurality of records are retrieved, the specifying unit 1021 adds the source IP address which is set in each record, in the infection list.

Furthermore, the specifying unit 1021 adds the destination IP address which is set in the retrieved record, to the target list, similar to the case of the process of S1707 (S1713). In a case where a plurality of records are retrieved, the specifying unit 1021 adds the destination IP address which is set in each record, to the target list. Then, a process proceeds to the process illustrated in FIG. 17B through the terminal A.

The search unit 1025 collects computer logs from respective computers 101 included in the information processing system, and retrieves a record for the event using the same account name as the account name extracted in S1701, in each collected computer log (S1715). In a case of receiving the time range in S1501 illustrated in FIG. 15, the search unit 1025 may not use a record for events occurring at the date and time which are not included in the time range as a retrieval target.

In addition, computer logs are records of the events occurring in the computer 101, by a logger of the operating system in the computer 101. If the logger is set such that events about the process are recorded, for example, the contents of a process start-up are recorded. In addition, if the logger is set such that file access is recorded, for example, the contents of file access are recorded.

FIG. 20 illustrates an example of a record for an event using the same account name as at the time of unauthorized authentication. The computer log in this example is a table format. A record corresponding to an event occurred in the computer 101 is provided in the computer log in this example. The record of the computer log has a field for setting date and time, a field for setting an event type, a field for setting an account name, a field for setting a domain name, and a field for setting attribute data. The date and time in the computer log represents the date and time when the event occurred. The account name and the domain name are used when the event is requested. The attribute data may differ depending on the event. Further, attribute data may not be present depending on the event.

In this example, it is assumed that a record, in which the same "adminX" as the account name that is set in the attribute data field of the record illustrated in FIG. 16, is retrieved, at S1715, and two records are obtained as a search result.

It is assumed that both records illustrated in FIG. 20 are contained in the computer log of the computer 101 of the IP address "x.x.x.5".

The type of the log-on, which is an event in the first record, is not specified. However, there is a possibility that this log-on corresponds to the SMB authentication or DCE/RPC authentication. Then, this log-on indicates that the computer 101 of the IP address "x.x.x.2" makes a request for authentication to the computer 101 of the IP address "x.x.x.5", using the same "adminX" as the account name that is used by the infected computer 203.

Therefore, there is a doubt that the log-on is due to an attack by the malware 201 of the same type as that of the malware 201 hidden in the infected computer 203 which is detected by the detection unit 1013. Here, it is estimated that the computer 101 of the IP address "x.x.x.2" is the infected computer 203 which was in hiding, and the computer 101 of the IP address "x.x.x.5" is the target computer 205 which was in hiding. Incidentally, since the accuracy of estimation depends on various conditions such as the characteristic of the malware 201 and the operation form of the computer 101 in some aspects, the accuracy of estimation will not be described further.

The log-off, which is an event in the second record, is not a subject of discrimination in this example.

A description will be made again with reference to FIG. 17B. The specifying unit 1021 adds the request source IP address that is set in the retrieved record, to infection list (S1717). In a case where a plurality of records are retrieved, the specifying unit 1021 adds the request source IP address which is set in each record, in the infection list. In a case where the request source IP address is not set in the retrieved record, the process of S1717 may be omitted.

The specifying unit 1021 adds the IP address of the computer 101 that generates the computer log including the record that has been retrieved in S1715, that is, the computer 101 that performed the event indicated in the record, to the target list (S1719). In a case where a plurality of records are retrieved, the specifying unit 1021 adds the IP address of the computer 101 for each record, to the target list. Upon completion of the first determination process, the process returns to the process of S1511 illustrated in FIG. 15.

A description will be made again with reference to FIG. 15. The specifying unit 1021 specifies records of a command that is regarded as fraud, out of remote operations that the infected computer 203 has requested (S1511). Since the operation log includes a record based on legitimate access, in this embodiment, records that are assumed to have a relatively high probability of being based on the unauthorized access are narrowed down.

In this example, the records of the commands for the task registration and service registration are specified. It is estimated that the task registration and service registration are unlikely to be performed in the normal use mode and there is a high possibility that they are commands by the malware 201.

Figure 21:
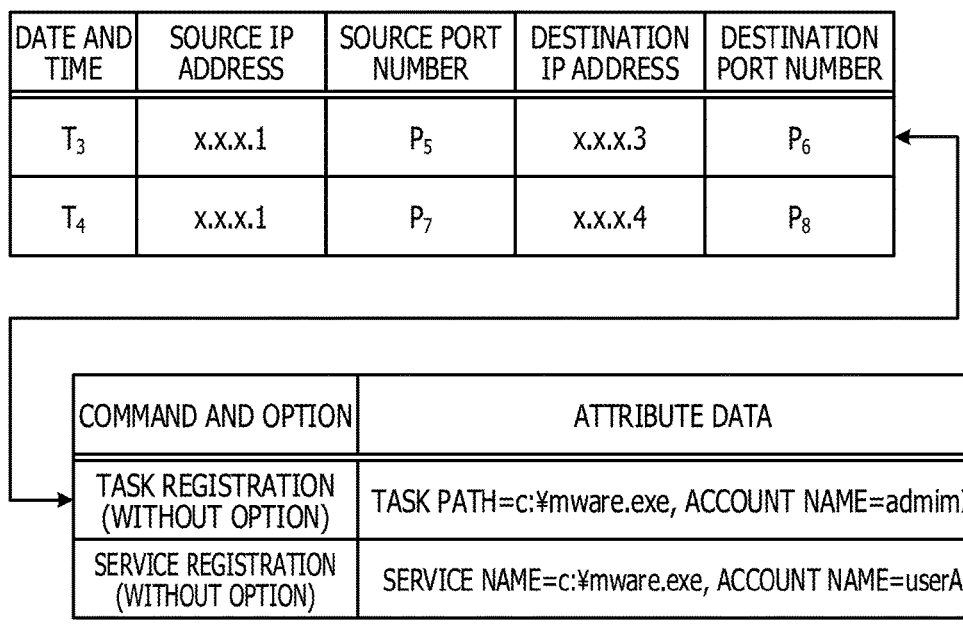
FIG. 21 is a diagram illustrating an example of a record for an unauthorized remote operation that an infected computer has requested.

FIG. 21 illustrates an example of the records for an unauthorized remote operation that the infected computer 203 has requested. In this example, it is assumed that the computer 101 of the IP address "x.x.x.1" is detected as the infected computer 203 by the detection unit 1013 and two records are specified in which the IP address "x.x.x.1" of the infected computer 203 is set in the source IP address in the process of S1511.

The first record indicates that the infected computer 203 performs the task registration on the computer 101 of the IP address "x.x.x.3". Further, in the task registration, a task path "c:\mware.exe" is used. In this example, in a case where the task registration is assumed to be due to the attack of the malware 201, there is a possibility of the malware 201 using the same task path "c:\mware.exe" or a file name "mware.exe" included in the task path in attacks against other computer 101. The following description will be given regarding an example to explore the traces of similar attacks, focusing the file name "mware.exe".

The second record indicates that the infected computer 203 performs the service registration on the computer 101 of the IP address "x.x.x.4". Further, in the service registration, the service name "ServiceY" is used. In this example, in a case where the service registration is assumed to be due to the attack of the malware 201, there is a possibility of the malware 201 using the same service name "ServiceY" in attacks against other computer 101. The following description will be given regarding an example to explore the traces of similar attacks, focusing the service name "ServiceY".

The type of commands as conditions to narrow down records is not limited to this example. For example, a record may be narrowed down, with account registration, file writing, file reading, a change of Windows network information, service start-up, service stop, service deletion, task start-up, task stop, task deletion, registry registration, a registry change, or registry deletion as a condition.

The conditions to narrow down records may be intended to limit, for example, a domain name, an account name, a file path, a file name, the hash value of a file, a service name, a task name, a registry key name, or attribute parameters for attribute items such as parameters that are set in a registry.

The conditions to narrow down records may be intended to combine the condition of a command and the condition of attribute data.

A description will be made again with reference to FIG. 15. The specifying unit 1021 adds the destination IP address that is set in the record specified in S1511, in other words, the IP address of the computer 101 which is remotely operated to the target list, similar to the case of the process of S1507 (S1513).

The determination unit 1017 performs the second determination process (S1515). In the second determination process, the determination unit 1017 determines the infected computer 203 and the target computer 205, based on the file name.

Figure 22:
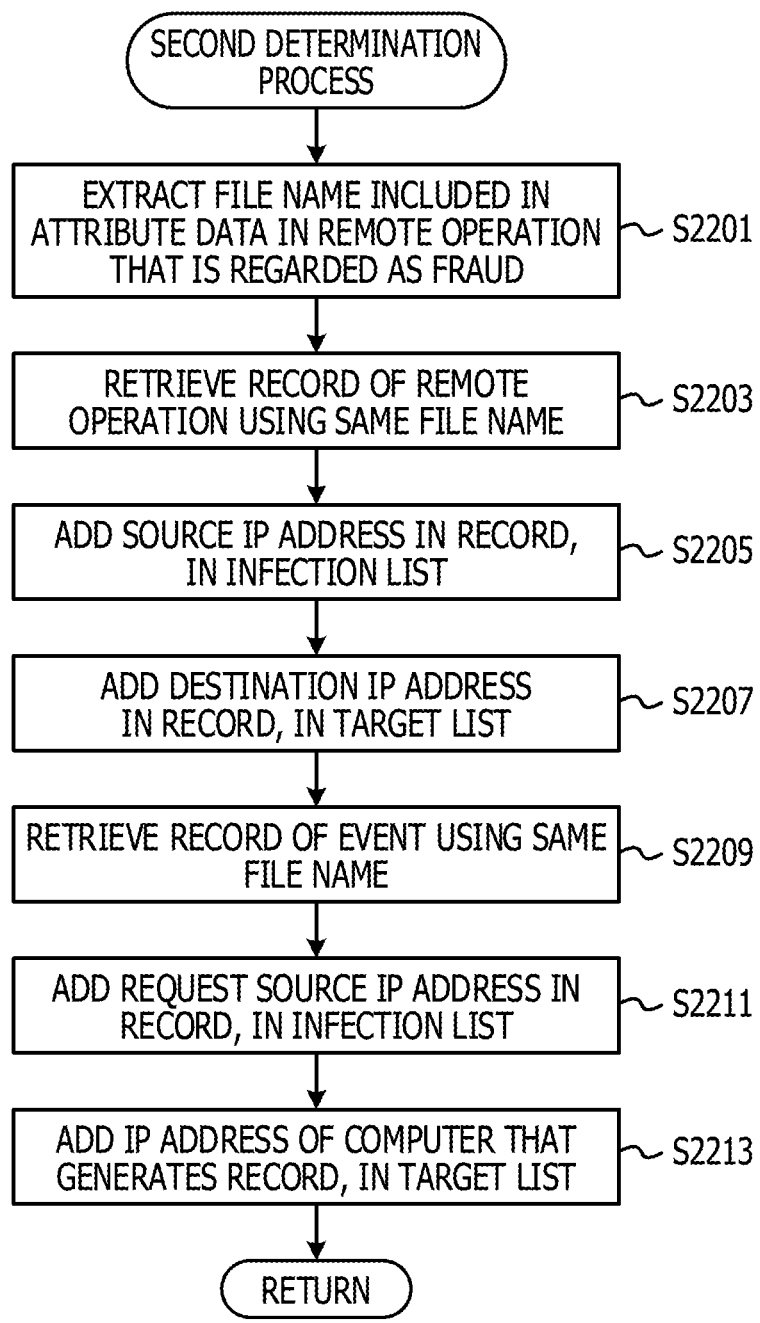
FIG. 22 is a diagram illustrating an example of a second determination process flow.

FIG. 22 illustrates an example of the second discrimination process flow. The extraction unit 1023 extracts a file name, from the attribute data field in the record specified in S1511 (S2201). In other words, the extraction unit 1023 obtains a file name included in the attribute data in the remote operation that is regarded as fraud.

The search unit 1025 retrieves a record for a remote operation using the same file name as the file name that is extracted in S2201, from the operation log (S2203).

FIG. 23 illustrates an example of a record for a remote operation using the same file name as at the time of an unauthorized remote operation. In this example, it is assumed that a record, in which the attribute parameter including the file name "mware.exe" specified based on the first record illustrated in FIG. 21 is set in the attribute data field, is retrieved at S2203, and four records are obtained as a search result.

The first record illustrated in FIG. 23 is the same as the first record illustrated in FIG. 21. The second record to the fourth record illustrated in FIG. 23 are newly specified.

The second record indicates that the computer 101 of the IP address "x.x.x.2" performs a file write on the computer 101 of the IP address "x.x.x.8", using the file path containing the same "mware.exe" as the file name used by the infected computer 203. There is a doubt that the file write in this case is due to an attack by the malware 201 of the same type as that of the malware 201 hidden in the infected computer 203 which is detected by the detection unit 1013. Therefore, it is estimated that the computer 101 of the IP address "x.x.x.2" is the infected computer 203 which was in hiding, and the computer 101 of the IP address "x.x.x.8" is the target computer 205 which was in hiding.

The third record indicates that the computer 101 of the IP address "x.x.x.5" performs a file write on the computer 101 of the IP address "x.x.x.9", using the file path containing the same "mware.exe" as the file name used by the infected computer 203. There is a doubt that the file write in this case is due to an attack by the malware 201 of the same type as that of the malware 201 hidden in the infected computer 203 which is detected by the detection unit 1013. Therefore, it is estimated that the computer 101 of the IP address "x.x.x.5" is the infected computer 203 which was in hiding, and the computer 101 of the IP address "x.x.x.9" is the target computer 205 which was in hiding.

The fourth record indicates that the computer 101 of the IP address "x.x.x.5" performs a task scheduling on the computer 101 of the IP address "x.x.x.9", using the schedule path containing the same "mware.exe" as the file name used by the infected computer 203. There is a doubt that the task scheduling in this case is due to an attack by the malware 201 of the same type as that of the malware 201 hidden in the infected computer 203 which is detected by the detection unit 1013. Therefore, it is estimated that the computer 101 of the IP address "x.x.x.5" is the infected computer 203 which was in hiding, and the computer 101 of the IP address "x.x.x.9" is the target computer 205 which was in hiding.

A description will be made again with reference to FIG. 22. The specifying unit 1021 adds the source IP address which is set in the retrieved record, in the infection list, similar to the case of the process of S1705 (S2205). In a case where a plurality of records are retrieved, the specifying unit 1021 adds the source IP address which is set in each record, in the infection list.

Furthermore, the specifying unit 1021 adds the destination IP address which is set in the retrieved record, to the target list, similar to the case of the process of S1707 (S2207). In a case where a plurality of records are retrieved, the specifying unit 1021 adds the destination IP address which is set in each record, to the target list.

In addition, the search unit 1025 retrieves a record for the event using the same file name as the file name extracted in S2201, from the respective computer logs collected in S1715 (S2209).

FIG. 24 illustrates an example of a record for an event using the same file name as at the time of an unauthorized remote operation. In this example, it is assumed that a record, in which the attribute parameter including the file name "mware.exe" specified based on the first record illustrated in FIG. 21 is set in the attribute data field, is retrieved at S2209, and one record is obtained as a search result. In addition, the record illustrated in FIG. 24 is assumed to be included in the computer log of the computer 101 of the IP address "x.x.x.9".

This record indicates that the process specified by the same "mware.exe" as the file name used by the infected computer 203 that is detected by the detection unit 1013 is started. However, whether or not the process has been started by the remote operation is unknown.

However, there is a doubt that the process is due to an attack by the malware 201 of the same type as that of the malware 201 hidden in the infected computer 203 which is detected by the detection unit 1013. Here, the computer 101 of the IP address "x.x.x.9" is estimated as the target computer 205 which was in hiding. Similar to the example described above, the accuracy of estimation is not described further.

A description will be made again with reference to FIG. 22. The specifying unit 1021 adds the request source IP address which is set in the record retrieved in S2209, in the infection list (S2211). In a case where a plurality of records are retrieved, the specifying unit 1021 adds the request source IP address which is set in each record, in the infection list. In a case where the request source IP address is not set in the retrieved record, the process of S2211 may be omitted.

In addition, the specifying unit 1021 adds the IP address of the computer 101 that generates the computer log containing the record retrieved in S2209, in other words, the computer 101 which executes an event indicated by the record, to the target list (S2213). In a case where a plurality of records are retrieved, the specifying unit 1021 adds the IP address of the computer 101 for each record, to the target list. If the second determination process is completed, the process returns to the process of S1517 illustrated in FIG. 15.

A description will be made again with reference to FIG. 15. The determination unit 1017 performs the third determination process (S1517). In the third determination process, the determination unit 1017 determines the infected computer 203 and the target computer 205, based on the service name.

Figure 25:
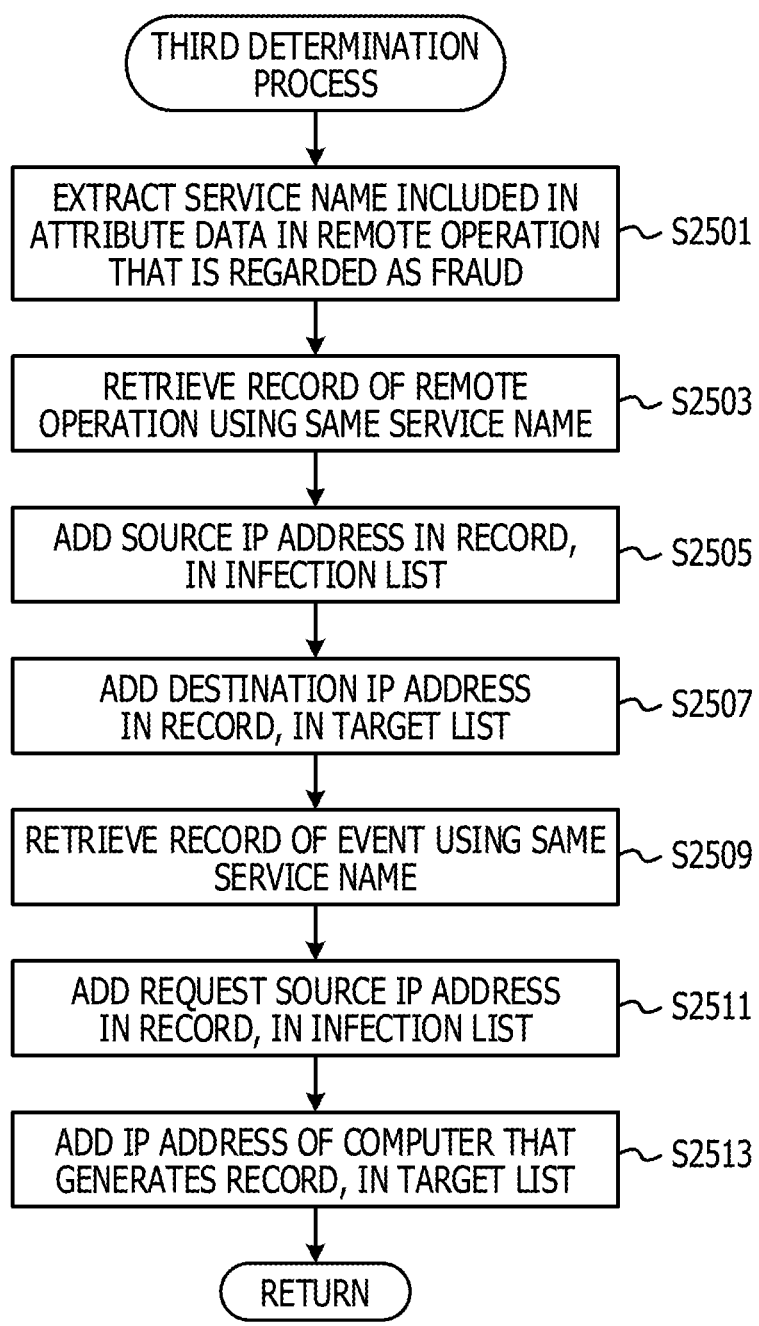
FIG. 25 is a diagram illustrating an example of a third determination process flow.

FIG. 25 illustrates an example of a third determination process flow. The extraction unit 1023 extracts a service name, from the attribute data field of the record specified in S1511. In other words, the extraction unit 1023 obtains a service name included in the attribute data in the remote operation which is expected to be unauthorized (S2501).

The search unit 1025 retrieves a record for the remote operation using the same service name as the service name extracted in S2501, from the operation log (S2503).

Figure 26:
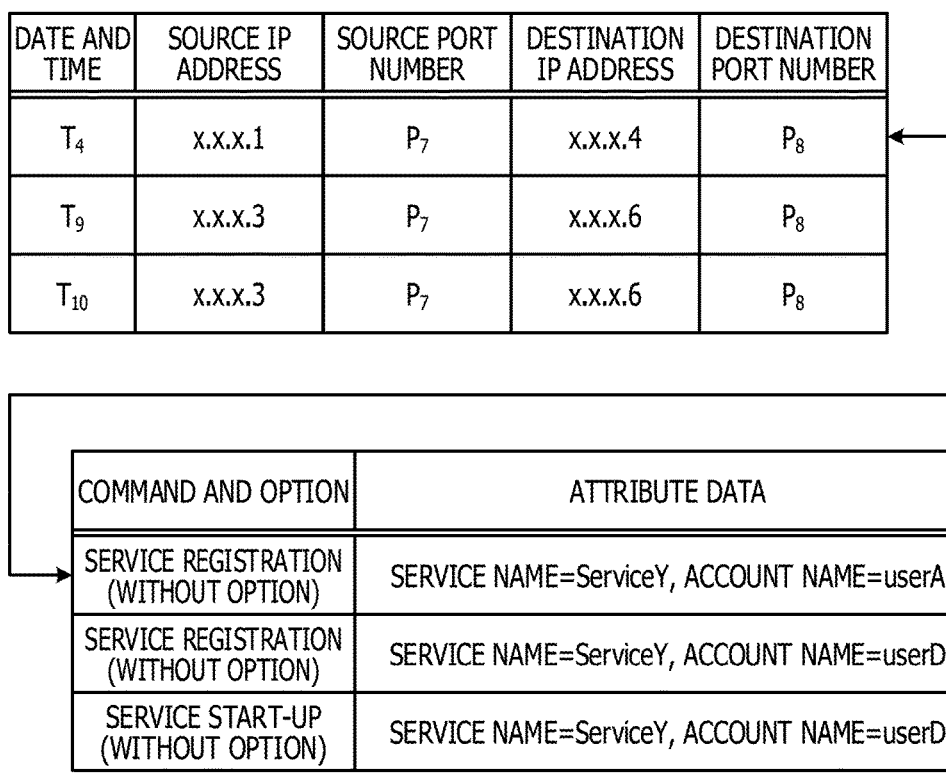
FIG. 26 is a diagram illustrating an example of a record for a remote operation using the same service name as at the time of an unauthorized remote operation.

FIG. 26 illustrates an example of a record for a remote operation using the same account name as at the time of an unauthorized remote operation. In this example, it is assumed that a record, in which a service name "ServiceY" specified based on the second record illustrated in FIG. 21 is set in the attribute data field, is retrieved at S2503, and three records are obtained as a search result.

The first record illustrated in FIG. 26 is the same as the second record illustrated in FIG. 21. The second record and the third record, illustrated in FIG. 26, are newly specified.

The second record indicates that the computer 101 of the IP address "x.x.x.3" performs service registration on the computer 101 of the IP address "x.x.x.6", using the same "ServiceY" as the service name used by the infected computer 203. There is a doubt that the service registration in this case is due to an attack by the malware 201 of the same type as that of the malware 201 hidden in the infected computer 203 which is detected by the detection unit 1013. Therefore, it is estimated that the computer 101 of the IP address "x.x.x.3" is the infected computer 203 which was in hiding, and the computer 101 of the IP address "x.x.x.6" is the target computer 205 which was in hiding.

The third record indicates that the computer 101 of the IP address "x.x.x.3" performs a service start-up on the computer 101 of the IP address "x.x.x.6", using the same "ServiceY" as the service name used by the infected computer 203. There is a doubt that the service start-up in this case is due to an attack by the malware 201 of the same type as that of the malware 201 hidden in the infected computer 203 which is detected by the detection unit 1013. Therefore, it is estimated that the computer 101 of the IP address "x.x.x.3" is the infected computer 203 which was in hiding, and the computer 101 of the IP address "x.x.x.6" is the target computer 205 which was in hiding.

A description will be made again with reference to FIG. 25. The specifying unit 1021 adds the source IP address which is set in the retrieved record, in the infection list, similar to the case of the process of S1705 (S2505). In a case where a plurality of records are retrieved, the specifying unit 1021 adds the source IP address which is set in each record, in the infection list.

Furthermore, the specifying unit 1021 adds the destination IP address which is set in the retrieved record, to the target list, similar to the case of the process of S1707 (S2507). In a case where a plurality of records are retrieved, the specifying unit 1021 adds the destination IP address which is set in each record, to the target list.

In addition, the search unit 1025 retrieves a record for the event using the same service name as the service name extracted in S2501, from each computer log collected in S1715 (S2509).

The specifying unit 1021 adds the request source IP address which is set in the retrieved record, in the infection list (S2511). In a case where a plurality of records are retrieved, the specifying unit 1021 adds the request source IP address which is set in each record, in the infection list. In a case where the request source IP address is not set in the retrieved record, the process of S2511 may be omitted.

In addition, the specifying unit 1021 adds the IP address of the computer 101 that generates the computer log containing the record retrieved in S2509, in other words, the computer 101 which executes an event indicated by the record, to the target list (S2513). In a case where a plurality of records are retrieved, the specifying unit 1021 adds the IP address of the computer 101 for each record, to the target list. If the third determination process is completed, the process returns to the process of S1519 illustrated in FIG. 15.

A description will be made again with reference to FIG. 15. The output unit 1031 outputs an infection list and/or a target list (S1519). In this example, the IP address of the infected computer 203 included in the infection list and/or a part or all of the IP addresses of the infected computer 203 that are included in the target list are output. The formats of the output are arbitrary, and the examples thereof include displaying the list on a screen, transmission of notification or the like, writing the list to a storage medium, printing a report, or the like. The output unit 1031 may notify, for example, the infected computer 203 specified in the infection list, of alert. Similarly, the output unit 1031 may notify, for example, the target computer 205 specified in the target list, of alert.

Figure 27:
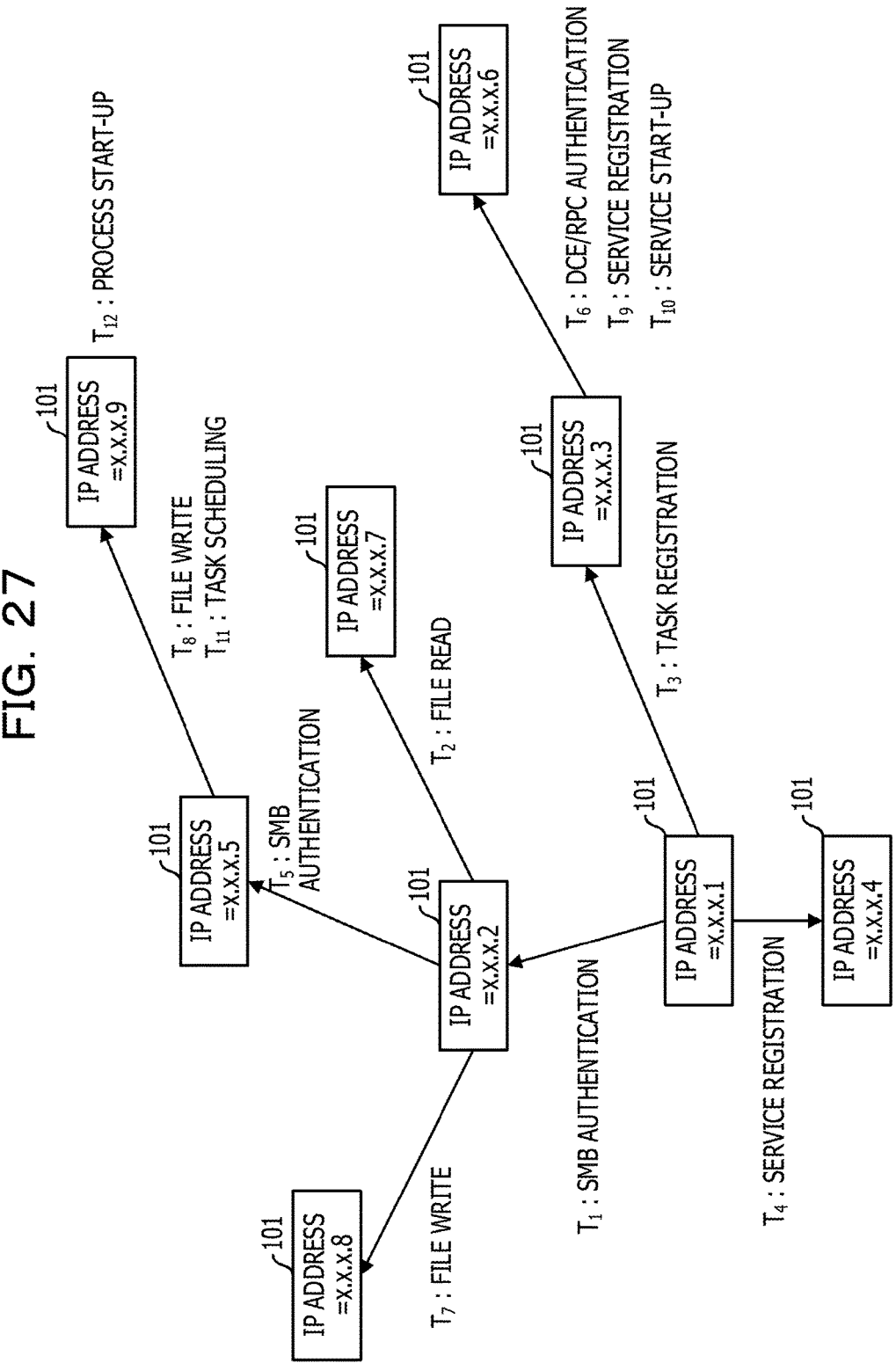
FIG. 27 is a diagram illustrating an example of a determination result.

FIG. 27 schematically illustrates an example of a determination result described above. The authentication and the remote operation, which are detected, will be described in order in which they occur. (1) At time $T_1$, the computer 101 of the IP address "x.x.x.1" makes a request for SMB authentication, to the computer 101 of the IP address "x.x.x.2". (2) At time $T_2$, the computer 101 of the IP address "x.x.x.2" performs the file read on the computer 101 of the IP address "x.x.x.7". (3) At time $T_3$, the computer 101 of the IP address "x.x.x.1" performs the task registration on the computer 101 of the IP address "x.x.x.3". (4) At time $T_4$, the computer 101 of the IP address "x.x.x.1" performs the service registration on the computer 101 of the IP address "x.x.x.4". (5) At time $T_5$, the computer 101 of the IP address "x.x.x.2" requests the SMB authentication on the computer 101 of the IP address "x.x.x.5". (6) At time $T_6$, the computer 101 of the IP address "x.x.x.3" requests the DCE/RPC authentication on the computer 101 of the IP address "x.x.x.6". (7) At time $T_7$, the computer 101 of the IP address "x.x.x.2" performs the file write on the computer 101 of the IP address "x.x.x.8". (8) At time $T_8$, the computer 101 of the IP address "x.x.x.5" performs the file write on the computer 101 of the IP address "x.x.x.9". (9) At time $T_9$, the computer 101 of the IP address "x.x.x.3" performs the service registration on the computer 101 of the IP address "x.x.x.6". (10) At time $T_{10}$, the computer 101 of the IP address "x.x.x.3" performs the service start-up on the computer 101 of the IP address "x.x.x.6". (11) At time $T_{11}$, the computer 101 of the IP address "x.x.x.5" performs scheduling for a task on the computer 101 of the IP address "x.x.x.9". (12) At time $T_{12}$, the computer 101 of the IP address "x.x.x.12" performs the process start-up. However, whether or not the process start-up is caused by the remote operation is unknown.

The above examples are not intended to denote the actual events, and are examples employed for convenience of explanation. Thus, there may be a difference from the actual event.

The computer 101 of the IP address "x.x.x.1", the computer 101 of the IP address "x.x.x.2", the computer 101 of the IP address "x.x.x.3", and the computer 101 of the IP address "x.x.x.5" are determined to be suspected of corresponding to the infected computer 203, based on these events. Further, the computer 101 of the IP address "x.x.x.4", the computer 101 of the IP address "x.x.x.6", the computer 101 of the IP address "x.x.x.7", the computer 101 of the IP address "x.x.x.8", and the computer 101 of the IP address "x.x.x.9" are determined to be suspected of corresponding to the target computer 205.

In the above example, in the above-described first determination process, the record of authentication that is suspected of fraud and the record of a remote operation are retrieved based on the account name. In the above-described second determination process, the record of the remote operation that is suspected of fraud is retrieved based on the account name. Further, in the above-described third determination process, the record of the remote operation that is suspected of fraud is retrieved based on the service name. However, the record of authentication and/or the record of a remote operation may be retrieved based on other attribute items. For example, a domain name included in the attribute data, a file path, the hash value of a file, a task name, a registry key name or a parameter which is set in the registry may be used as the search key. In addition, the domain name and the account name is an example of the attribute item that specifies the request source of authentication or a remote operation. Further, the file path, the file name, the hash value of a file, the service name, the task name, the registry key name or the parameter which is set in the registry are examples of attribute items for specifying the target or contents of the remote operation.

The search target may be limited to a record relating to a particular command.

Furthermore, the determination process may be performed recursively. The processes of S1505 to S1517 illustrated in FIG. 15 may be performed again, for example, based on the IP address of the infected computer 203 added in the infection list. In this way, it is possible to further find out the infected computer 203 and the target computer 205, based on the search key that was not originally extracted.

A MAC address or a host name may be used as data for identifying the computer 101, instead of the IP address. An IP address and a MAC address may be used. An IP address and a host name may be used. An IP address, a MAC address, and a host name may be used.

According to the present embodiment, it becomes easy to specify the infringement range due to cyberattacks. Specifically, it is possible to determine other infected computers 203 and/or target computer 205, based on the action similar to that of the infected computer 203.

Further, since the attribute parameters which are the search keys may be extracted from the request message sent during execution of a command having a high possibility of fraud, the accuracy of determination is further increased.

In addition, since the account name is used as a search key, it is possible to monitor the attack by the malware 201 in a relatively wide range.

In addition, since the file name is used as a search key, it is possible to monitor the attack by the malware 201, based on, for example, data sharing.

In addition, since the service is used as a search key, it is possible to monitor the attack by the malware 201 using various services.

Embodiment 2

A description will be given of an example of searching for a record of an operation log, by extracting a combination of a command that is regarded as fraud and attribute items as a search key.

Figure 28:
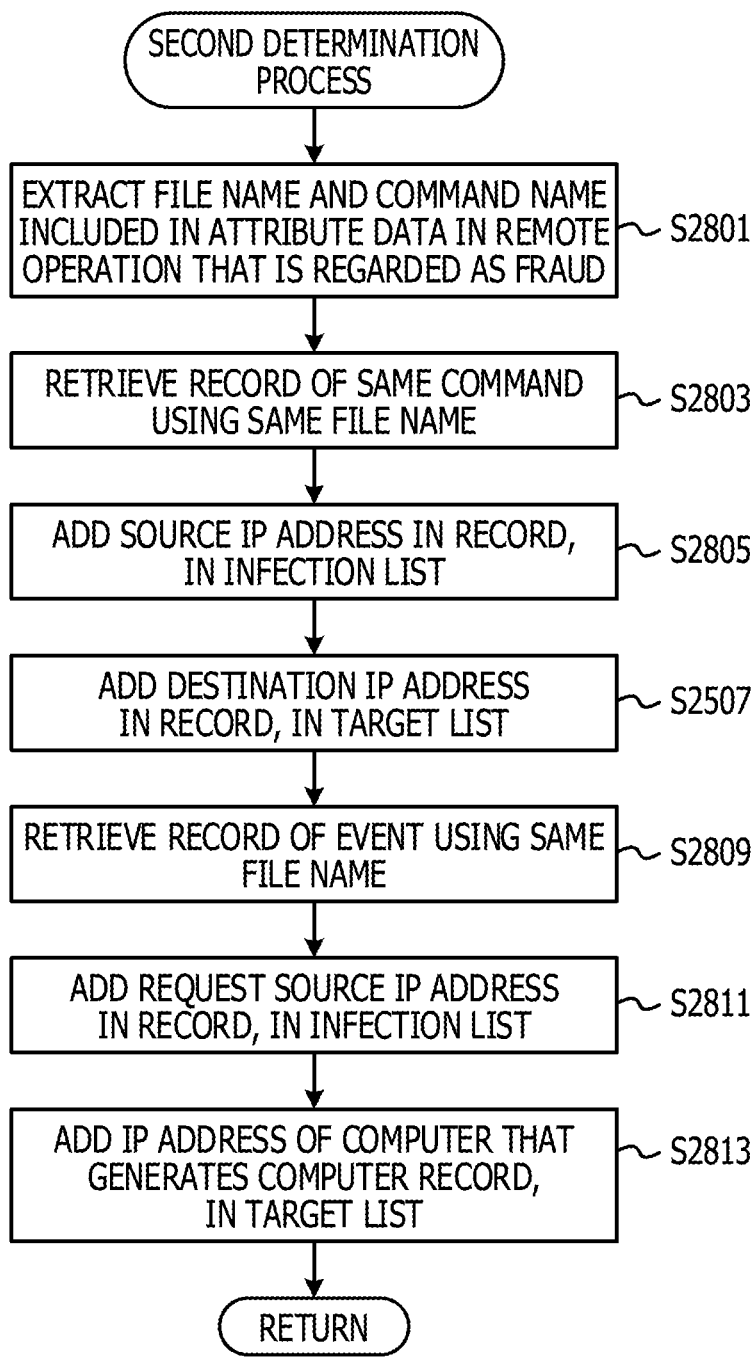
FIG. 28 is a diagram illustrating an example of a second determination process flow according to Embodiment 2.

FIG. 28 illustrates an example of a second discrimination process flow according to Embodiment 2. In this embodiment, the second determination process illustrated in FIG. 28 is executed, instead of the second determination process illustrated in FIG. 22.

The extraction unit 1023 extracts a file name from the attribute data field in the record specified in S1511, and further extracts a command name from the record (S2801).

The search unit 1025 stores the same file name as the file name extracted in S2801 in the attribute data field, and retrieves a record containing the same command name as the command name extracted in S2801, from the operation log (S2803).

The processes of S2205 to S2213 are the same as in the case of FIG. 22.

Figure 29:
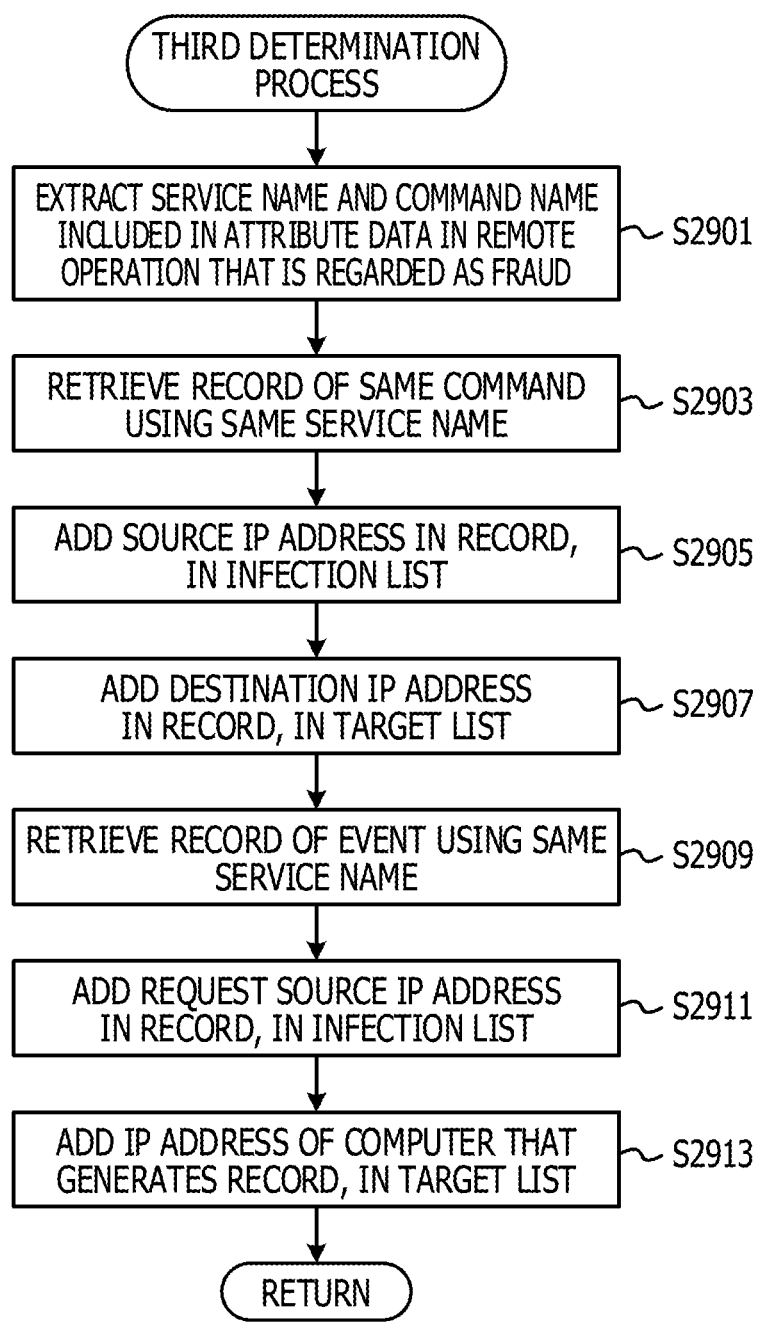
FIG. 29 is a diagram illustrating an example of a third determination process flow according to Embodiment 2.

FIG. 29 illustrates an example of a third discrimination process flow according to Embodiment 2. In this embodiment, the third determination process illustrated in FIG. 29 is executed, instead of the third discrimination process illustrated in FIG. 25.

The extraction unit 1023 extracts a service name from the attribute data field of the record specified in S1511, and further extracts a command name from the record (S2901).

The search unit 1025 stores the same service name as the service name extracted in S2901 in the attribute data field, and retrieves a record containing the same command name as the command name extracted in S2901, from the operation log (S2903).

The processes of S2505 to S2513 are the same as in the case of FIG. 25.

According to the present embodiment, in a case where there is a relationship between the command and attribute parameters as a characteristic of the malware 201, the accuracy of determination is further increased.

Hitherto, the embodiments have been described, but the scope is not limited thereto. For example, the functional block configuration described above may not match a program module configuration in some cases.

The configuration of each storage area described above is only an example, and it does not mean to be configured as described above. Furthermore, even in the processing flow, if the processing result is not changed, the order of processes may be changed, and a plurality of processes may be executed in parallel.

Incidentally, the monitoring device 103 described above is a computer device, and as illustrated in FIG. 30, a memory 2501, a central processing unit (CPU) 2503, a hard disk drive (HDD) 2505, a display control unit 2507 connected to a display device 2509, a drive device 2513 for a removal disk 2511, an input device 2515 and a communication control unit 2517 for connection to a network are connected through a bus 2519. An operating system (OS) and an application program for executing a process in the present embodiment are stored in the HDD 2505, and when the OS and the application program are executed by the CPU 2503, they are read out from the HDD 2505 to the memory 2501.

The CPU 2503 controls the display control unit 2507, the communication control unit 2517, and the drive device 2513, in accordance with the processing contents of the application program so as to execute a predetermined operation. In addition, the data which are being processed is stored mainly in the memory 2501, but it may be stored in the HDD 2505. In the embodiments, the application program for executing the process described above is distributed by being stored in a computer-readable removable disk 2511, and is installed from the drive device 2513 to the HDD 2505. The application program may be installed in the HDD 2505, over a network such as the Internet and the communication control unit 2517, in some cases. Such a computer device realizes various functions as described above, by hardware such as the CPU 2503 and the memory 2501 described above, and programs such as OS and application programs organically cooperating with each other.

The summary of the embodiments described above is as follows.

A network monitoring method according to the present embodiment includes (A) an accumulation process of extracting an identifier of a source computer and an identifier of a destination computer from a packet that is captured from a network, specifying an attribute parameter in a remote operation for the destination computer by the source computer, and accumulating a record that contains the identifier of the source computer, the identifier of the destination computer, and the attribute parameter, (B) an extracting process of extracting an attribute parameter, from the record in which the identifier of the source computer corresponds to the identifier of an infected computer, (C) a search process of searching a record containing the extracted attribute parameter, and (D) a process of specifying the identifier of the source computer or the identifier of the destination computer, which is contained in the retrieved record.

In this way, it becomes easy to specify the infringement range by cyberattacks.

Furthermore, in the above accumulation process, the attribute parameter may be extracted from the packet.

In this way, it is possible to extract an account name from the packet corresponding to, for example, a request message for authentication request.

Furthermore, in the above accumulation process, an attribute parameter which has been previously extracted from the packet that precedes the packet in accordance with protocol of the remote operation may be used.

In this way, an account name can be extracted from the packet corresponding to for example, a file read request message.

Furthermore, in the above accumulation process, a command executed by the remote operation may be specified, and the identification data of the specified command may be included in the record. Furthermore, in the above accumulation process, the identification data of a predetermined command is included, and an attribute parameter may be extracted from a record in which the identifier of the source computer corresponds to the identifier of the infected computer.

In this way, since the attribute parameter which is the search key is extracted from the request message transmitted during execution of a command having a high possibility of fraud, the accuracy of determination is further increased.

Furthermore, in the above extraction processing, the identification data and the attribute parameter may be extracted.

In the above retrieval process, a record containing the extracted identification data and the extracted attribute parameter may be extracted.

In this way, in a case where there is a relationship between the command and the attribute parameter as a characteristic of malware, the accuracy of determination is further increased.

Further, the attribute parameter may be an account name.

In this way, since the account name is frequently used in the remote operation, it is possible to monitor attacks by the malware in a relatively wide range.

Further, the attribute parameter may be a file name.

In this way, it is possible to monitor the attacks by the malware, based on for example, data sharing.

Further, the attribute parameter may also be a service name.

In this way, it is possible to monitor the attacks by the malware using various services.

Incidentally, it is possible to create a program for causing a computer to execute a process by the above method, and the program may be stored in, for example, a computer-readable storage medium or storage device such as a flexible disk, a CD-ROM, a magneto-optical disk, a semiconductor memory, and a hard disk. Incidentally, intermediate processing results are generally temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network monitoring device that monitors a network, comprising:
    a memory; and
    a processor coupled to the memory and configured to:
    accumulate a plurality of logs in the memory by repeating a logging process for a plurality of packets transmitted via the network, the logging process including:
        extracting, from each of the plurality of packets, a source identifier of a source computer, a destination identifier of a destination computer, and an attribute parameter corresponding to a content of an operation for the destination computer by the source computer, and
        storing, into the memory, the plurality of logs including the source identifier, the destination identifier, and the attribute parameter,
    execute a detection process that detects a target computer having a possibility of being attacked by an infected computer based on the plurality of logs, when the infected computer which is infected with a malware is specified, the detection process including:
        extracting a first destination identifier and a first attribute parameter from a first log, included in the plurality of logs, including an identifier of the infected computer as a source identifier, and
        extracting a second source identifier and a second destination identifier from a second log, included in the plurality of logs, including the first attribute parameter as an attribute parameter, and
    output the first destination identifier, the second source identifier, and the second destination identifier on a display screen of a display device, as information identifying the target computer and the other infected computer.

2. The network monitoring device according to claim 1, wherein the operation is at least one of an authentication operation for the destination computer by the source computer, a remote operation for the destination computer by the source computer, and an event operation for the destination computer by the source computer.

3. The network monitoring device according to claim 2, wherein the attribute parameter is at least one of an account name, a file name, a service name, a domain name, a file path, a hash value of a file, a task name, and a registry key.

4. The network monitoring device according to claim 2, wherein in the logging process, the attribute parameter which is extracted according to protocol of the remote operation in advance from a preceding packet that precedes another packet the plurality of packets is used.

5. The network monitoring device according to claim 2, wherein
    the logging process includes specifying a command that is executed by the remote operation, and
    the plurality of logs include command information on the command.

6. The network monitoring device according to claim 5, wherein the first log has a specific command information in the command information.

7. The network monitoring device according to claim 6, wherein the specific command information is a command that is regarded as fraud.

8. The network monitoring device according to claim 7, wherein the command that is regarded as fraud is a predetermined command that is set in advance.

9. A network monitoring method for monitoring a network, the network monitoring method comprising:
    accumulating a plurality of logs in a memory by repeating a logging process for a plurality of packets transmitted via the network, the logging process including:
        extracting, from each of the plurality of packets, a source identifier of a source computer, a destination identifier of a destination computer, and an attribute parameter corresponding to a content of an operation for the destination computer by the source computer, and
        storing, into the memory, the plurality of logs including the source identifier, the destination identifier, and the attribute parameter;
    executing, by a processor, a detection process that detects a target computer having a possibility of being attacked by an infected computer based on the plurality of logs, when the infected computer which is infected with a malware is specified, the detection process including:
        extracting a first destination identifier and a first attribute parameter from a first log, included in the plurality of logs, including an identifier of the infected computer as a source identifier, and
        extracting a second source identifier and a second destination identifier from a second log, included in the plurality of logs, including the first attribute parameter as an attribute parameter; and
    outputting the first destination identifier, the second source identifier, and the second destination identifier on a display screen of a display device, as information identifying the target computer and the other infected computer.

10. The network monitoring method according to claim 9, wherein the operation is at least one of an authentication operation for the destination computer by the source computer, a remote operation for the destination computer by the source computer, and an event operation for the destination computer by the source computer.

11. The network monitoring method according to claim 10, wherein the attribute parameter is at least one of an account name, a file name, a service name, a domain name, a file path, a hash value of a file, a task name, and a registry key.

12. The network monitoring method according to claim 10, wherein in the logging process, the attribute parameter which is extracted according to protocol of the remote operation in advance from a preceding packet that precedes another packet the plurality of packets is used.

13. The network monitoring method according to claim 10, wherein
the logging process includes specifying a command that is executed by the remote operation, and
the plurality of logs include command information on the command.

14. The network monitoring method according to claim 13, wherein the first log has a specific command information in the command information.

15. The network monitoring method according to claim 14, wherein the specific command information is a command that is regarded as fraud.

16. The network monitoring method according to claim 15, wherein the command that is regarded as fraud is a predetermined command that is set in advance.

17. A non-transitory computer-readable storage medium storing a network monitoring program causes a computer to execute a process, the process comprising:
accumulating a plurality of logs in a memory by repeating a logging process for a plurality of packets transmitted via the network, the logging process including:
extracting, from each of the plurality of packets, a source identifier of a source computer, a destination identifier of a destination computer, and an attribute parameter corresponding to a content of an operation for the destination computer by the source computer, and
storing, into the memory, the plurality of logs including the source identifier, the destination identifier, and the attribute parameter;
executing, by a processor, a detection process that detects a target computer having a possibility of being attacked by an infected computer based on the plurality of logs, when the infected computer which is infected with a malware is specified, the detection process including:
extracting a first destination identifier and a first attribute parameter from a first log, included in the plurality of logs, including an identifier of the infected computer as a source identifier, and
extracting a second source identifier and a second destination identifier from a second log, included in the plurality of logs, including the first attribute parameter as an attribute parameter; and
outputting the first destination identifier, the second source identifier, and the second destination identifier on a display screen of a display device, as information identifying the target computer and the other infected computer.

18. The non-transitory computer-readable storage medium according to claim 17, wherein the operation is at least one of an authentication operation for the destination computer by the source computer, a remote operation for the destination computer by the source computer, and an event operation for the destination computer by the source computer.

19. The non-transitory computer-readable storage medium according to claim 18, wherein the attribute parameter is at least one of an account name, a file name, a service name, a domain name, a file path, a hash value of a file, a task name, and a registry key.

20. The non-transitory computer-readable storage medium according to claim 18, wherein in the logging process, the attribute parameter which is extracted according to protocol of the remote operation in advance from a preceding packet that precedes another packet the plurality of packets is used.

* * * * *